United States Patent
Lin

(10) Patent No.: US 11,791,952 B2
(45) Date of Patent: Oct. 17, 2023

(54) DATA RE-TRANSMISSION CONTROL METHOD AND RELATED PRODUCT

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/610,811

(22) PCT Filed: May 3, 2017

(86) PCT No.: PCT/CN2017/082919
§ 371 (c)(1),
(2) Date: Nov. 4, 2019

(87) PCT Pub. No.: WO2018/201352
PCT Pub. Date: Nov. 8, 2018

(65) Prior Publication Data
US 2021/0160010 A1    May 27, 2021

(51) Int. Cl.
*H04L 1/1867* (2023.01)
*H04L 1/1607* (2023.01)
(Continued)

(52) U.S. Cl.
CPC ............ *H04L 1/189* (2013.01); *H04L 1/1614* (2013.01); *H04L 1/1825* (2013.01); *H04L 5/0055* (2013.01)

(58) Field of Classification Search
CPC ..... H04L 1/189; H04L 5/0055; H04L 1/1825; H04L 1/1614
(Continued)

(56) References Cited

U.S. PATENT DOCUMENTS

| 2010/0110971 A1 | 5/2010 | Kim |
| 2010/0272033 A1 | 10/2010 | Fwu |

(Continued)

FOREIGN PATENT DOCUMENTS

| CN | 101174927 A | 5/2008 |
| CN | 101662346 A | 3/2010 |

(Continued)

OTHER PUBLICATIONS

Qualcomm, "Multi-bit HARQ-ACK feedback HARQ design principle", R1-1705618, Apr. 3-7, 2017. (From Applicant's IDS) (Year: 2017).*

(Continued)

*Primary Examiner* — Mang Hang Yeung

(57) ABSTRACT

Disclosed are a data re-transmission control method and a related product. The method comprises: a terminal receiving first downlink data, wherein the first downlink data includes P code block groups in N code block groups of a pre-set transmission block; the terminal carrying out a decoding operation on the P code block groups to obtain feedback information about P bits, wherein the feedback information about each bit is used for indicating whether a corresponding code block group needs to be re-transmitted; and the terminal sending information, wherein the information is used for instructing a network side device to re-transmit M code block groups, and the M code block groups include the code block groups, needing to be re-transmitted, in the N code block groups. The embodiments of the present invention are beneficial for improving the flexibility of re-transmitting code block groups in a service data transmission block in a wireless communication system.

14 Claims, 15 Drawing Sheets

(51) Int. Cl.
*H04L 1/1825* (2023.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2010/0272047 A1 | 10/2010 | Zhu | |
| 2010/0273435 A1 | 10/2010 | Sun | |
| 2010/0274899 A1 | 10/2010 | Shrivastava | |
| 2010/0275081 A1 | 10/2010 | Zhu | |
| 2010/0275085 A1 | 10/2010 | Venkatachalam | |
| 2010/0287452 A1 | 11/2010 | Xu | |
| 2013/0188585 A1 | 7/2013 | Sun | |
| 2014/0016606 A1 | 1/2014 | Shrivastava | |
| 2016/0226643 A1 | 8/2016 | Mallik et al. | |
| 2018/0262316 A1* | 9/2018 | Wang | H04L 5/0053 |
| 2018/0270022 A1* | 9/2018 | Sun | H04L 1/1896 |
| 2019/0181986 A1* | 6/2019 | Kitamura | H04L 1/1819 |
| 2019/0207734 A1 | 7/2019 | Yang et al. | |
| 2019/0356430 A1* | 11/2019 | Cheng | H04L 1/1614 |
| 2019/0386782 A1 | 12/2019 | Yang et al. | |
| 2020/0028627 A1* | 1/2020 | Andersson | H04L 1/1819 |

FOREIGN PATENT DOCUMENTS

| | | |
|---|---|---|
| CN | 101795177 A | 8/2010 |
| CN | 102055558 A | 5/2011 |
| CN | 102281133 B | 2/2014 |
| CN | 103905170 A | 7/2014 |
| CN | 106301677 A | 1/2017 |
| EP | 3499771 A1 | 6/2019 |
| RU | 2544007 C2 | 3/2015 |
| TW | I566542 B | 1/2017 |
| WO | 03044997 A1 | 5/2003 |
| WO | 03045079 A1 | 5/2003 |
| WO | 2009097458 A1 | 8/2009 |
| WO | 2010105536 A1 | 9/2010 |
| WO | 2016126330 A1 | 8/2016 |

OTHER PUBLICATIONS

Lenovo et al., "Discussion on enhance HARQ feedback and CBG-based partial retransmission", R1-1705653, Apr. 3-7, 2017. (From Applicant's IDS) (Year: 2017).*

First Office Action of the Canadian application No. 3062956, dated Dec. 8, 2020.

First Office Action of the Chilean application No. 201903109, dated Dec. 18, 2020.

First Office Action of the European application No. 17908167.4, dated Nov. 11, 2020.

First Office Action of the Chinese application No. 201911296788.4, dated Nov. 3, 2020.

International Search Report in the international application No. PCT/CN2017/082919, dated Jan. 3, 2018.

Written Opinion of the International Search Authority in the international application No. PCT/CN2017/082919, dated Jan. 3, 2018.

First Office Action of the Russian application No. 2019137987, dated Jun. 8, 2020.

Qualcomm Incorporated; "Multi-bit HARQ-ACK feedback HARQ design principle", 3GPP Draft, R1-1705618 Multi-Bit HARQ-ACK Feedback HARQ Design Principle, 3rd Generation Partnership Project (3GPP), Mobile Competence Centre; 650, Route Des Lucioles; F-06921 Sophia-Antipolis Cedex, vol. RAN WG1, No. Spokane, USA; Apr. 3, 2017-Apr. 7, 2017; Apr. 2, 2017 (Apr. 2, 2017), XP051243742, * the whole document *.

Lenovo et al; "Discussion on enhanced HARQ feedback and CBG-based partial retransmission", 3GPP Draft; R1-1705653, 3rd Generation Partnership Project (3GPP), Mobile Competence Centre; 650, Route Des Lucioles; F-06921 Sophia-Antipolis Cedex; France, vol. RAN WGI, No. Spokane, USA; Apr. 3, 2017-Apr. 7, 2017; Apr. 2, 2017 (Apr. 2, 2017), XP051243774, * pp. 1-4 *.

Supplementary European Search Report in the European application No. 17908167.4, dated Feb. 24, 2020.

English Translation of the Written Opinion of the International Search Authority in the international application No. PCT/CN2017/082919, dated Jan. 3, 2018.

Office Action of the Indian application No. 201917049084, dated May 5, 2021.

First Office Action of the Korean application No. 10-2019-7034911, dated May 26, 2021.

First Office Action of the Japanese application No. 2019-560110, dated Apr. 16, 2021.

Written Opinion of the Singaporean application No. 11201910167R, dated Mar. 22, 2021.

Second Office Action of the Chilean application No. 201903109, dated Mar. 16, 2021.

Office Action of the Taiwanese application No. 107114477, dated Sep. 8, 2021.

Notice of Rejection of the Japanese application No. 2019-560110, dated Nov. 2, 2021.

First Office Action of the Israeli application No. 270344, dated Mar. 15, 2022.

First Office Action of the Australian application No. 2017412432, dated Mar. 23, 2022.

First Office Action of the Vietnamese application No. 1-2019-06616, dated Mar. 31, 2023.

First Office Action of the Indonesian application No. P00201911210, dated Jul. 12, 2022.

Hearing Notice of the Indian application No. 201917049084, dated Jul. 31, 2023. 2 pages.

First Office Action of the Chinese application No. 201780090350.3, dated Aug. 18, 2023. 15 pages with English translation.

* cited by examiner

DATA RE-TRANSMISSION CONTROL METHOD AND RELATED PRODUCT

CROSS-REFERENCE TO RELATED APPLICATIONS

This is a U.S. national phrase application under 35 U.S.C 371 based on International Patent Application No. PCT/CN2017/082919, filed on May 3, 2017, the contents of which are incorporated by reference herein in its entirety for all purposes.

TECHNICAL FIELD

The disclosure relates to the technical field of communications, and particularly to a data retransmission control method and a related product.

BACKGROUND

5th-Generation (5G) New Radio (NR) is a subject raised recently by the 3rd Generation Partnership Project (3GPP). Along with increasingly deep discussions about a 5G technology, on one hand, because of backward compatibility of a communication system, a new technology researched and developed later tends to be compatible with a technology which has been standardized before; and on the other hand, because of existence of numerous existing designs for 4th Generation mobile communication (4G) Long Term Evolution (LTE), flexibility of 5G may inevitably be sacrificed for compatibility, which brings reduction in performance. Therefore, researches in two directions are concurrently made by the 3GPP at present. Herein, the technical discussion group not considering backward compatibility is called 5G NR.

In an LTE system, an Automatic Repeat reQuest (ARQ) protocol refers to that a sender, every time when sending a data packet, temporarily stops to wait for Acknowledgement (ACK) information of a receiver. When the data packet reaches the receiver, error detection is performed thereon, an ACK signal is returned in case of correct reception, and a Negative Acknowledgement (NACK) signal is returned in case of an error. The sender, when receiving the ACK signal, sends new data, otherwise resends the data packet transmitted last time. While waiting for the ACK information, a channel is idle, and no data is sent. Since during any time period, the sender and the receiver operate the same data packet, it is relatively easy to implement and low in signaling overhead, and the requirement on a buffer size of the receiver is low.

In a 5G NR system, for an enhanced Mobile Broadband (eMBB) service, ACK/NACK feedbacks for different code blocks in a transport block is raised in the industry, and thus a more flexible code block retransmission mechanism is required for adaptation to data transmission of the future communication system.

SUMMARY

Embodiments of the disclosure provide a data retransmission control method and a related product.

According to a first aspect, the embodiments of the disclosure provide a data retransmission control method, which may include:

receiving, by a terminal, first downlink data, wherein the first downlink data comprises P Code Block Groups (CBGs) in N CBGs of a preset transport block, P and N are positive integers, and P is less than or equal to N;

acquiring, by the terminal, P-bit feedback information through decoding the P CBGs, wherein each bit of the feedback information indicates whether the respective CBG is needed to be retransmitted; and sending, by the terminal, information for notifying a network-side device to retransmit M CBGs, wherein the M CBGs comprise the CBGs needed to be retransmitted in the N CBGs, M is a positive integer, and M is less than or equal to N.

In a possible design, after sending, by the terminal, the information, the method may further include: receiving, by the terminal, the M CBGs.

In a possible design, the CBGs needed to be retransmitted in the N CBGs may include at least one of the following: the CBGs indicated by the P-bit feedback information as being needed to be retransmitted; or the CBGs in the N CBGs other than the P CBGs.

In a possible design, the operation of sending, by the terminal, the information may include:

sending, by the terminal, first information, wherein the first information comprises (P+1)-bit feedback information, wherein a first preset bit of the feedback information in the (P+1)-bit feedback information is a first preset numerical value, the feedback information in the (P+1)-bit feedback information other than the first preset numerical value is first preset information, and the first information is used for notifying the network-side device to retransmit the N CBGs; and the operation of receiving, by the terminal, the M CBGs may include:

receiving, by the terminal, second downlink data, wherein the second downlink data comprises the N CBGs.

In a possible design, the operation of sending, by the terminal, the information may include:

sending, by the terminal, second information, wherein the second information comprises (P+1)-bit feedback information, wherein a second preset bit of the feedback information in the (P+1)-bit feedback information is a second preset numerical value, the P-bit feedback information in the (P+1)-bit feedback information other than the preset bit is the acquired P-bit feedback information, and the second information is used for notifying the network-side device to retransmit the CBGs indicated by the P-bit feedback information as being needed to be retransmitted; and the operation of receiving, by the terminal, the M CBGs may include:

receiving, by the terminal, third downlink data, wherein the third downlink data comprises the CBGs indicated by the P-bit feedback information as being needed to be retransmitted.

In a possible design, the operation of sending, by the terminal, the information may include:

sending, by the terminal, third information, wherein the third information comprises N-bit feedback information, wherein a bitmap correspondence relationship of the N-bit feedback information is the same as a sequence of the N CBGs of the preset transport block, the feedback information at bit positions corresponding to the P CBGs in the N-bit feedback information is the acquired P-bit feedback information, the feedback information in the N-bit feedback information other than the P-bit feedback information is second preset information, and the third information is used for notifying the network-side device to retransmit the CBGs indicated by the acquired P-bit feedback information as being needed to be retransmitted; and the operation of receiving, by the terminal, the M CBGs may include:

receiving, by the terminal, fourth downlink data, wherein the fourth downlink data comprises the CBGs indicated by the P-bit feedback information as being needed to be retransmitted.

In a possible design, the operation of sending, by the terminal, the information may include:

sending, by the terminal, fourth information, wherein the fourth information comprises N-bit feedback information, a bitmap correspondence relationship of the N-bit feedback information is the same as a sequence of the N CBGs of the preset transport block, the feedback information at bit positions corresponding to the P CBGs in the N-bit feedback information is the acquired P-bit feedback information, the feedback information in the N-bit feedback information other than the P-bit feedback information is third preset information, and the fourth information is used for notifying the network-side device to retransmit at least one of the following: the CBGs indicated by the P-bit feedback information as being needed to be retransmitted, or the CBGs corresponding to bits where the third preset information is located in the N-bit feedback information; and the operation of receiving, by the terminal, the M CBGs may include:

receiving, by the terminal, fifth downlink data, wherein the fifth downlink data comprises at least one of the following: the CBGs indicated by the P-bit feedback information as being needed to be retransmitted, or the CBGs corresponding to the bits where the third preset information is located in the N-bit feedback information.

According to a second aspect, the embodiments of the disclosure provide a data retransmission control method, which may include:

sending, by a network-side device, first downlink data, wherein the first downlink data comprises P Code Block Groups (CBGs) in N CBGs of a preset transport block, P and N are positive integers, and P is less than or equal to N; and receiving, by the network-side device, information for notifying the network-side device to retransmit M CBGs, wherein the M CBGs comprise the CBGs needed to be retransmitted in the N CBGs, M is a positive integer, M is less than or equal to N, P-bit feedback information is acquired from a terminal performing a decoding operation on the P CBGs, and each bit of the feedback information indicates whether the respective CBG is needed to be retransmitted.

In a possible design, after receiving, by the network-side device, the information, the method may further include:

sending, by the network-side device, the M CBGs.

In a possible design, the CBGs needed to be retransmitted in the N CBGs may include at least one of the following: the CBGs indicated by the P-bit feedback information as being needed to be retransmitted; or the CBGs in the N CBGs other than the P CBGs.

In a possible design, the operation of receiving, by the network-side device, the information may include:

receiving, by the network-side device, first information, wherein the first information comprises (P+1)-bit feedback information, a first preset bit of the feedback information in the (P+1)-bit feedback information is a first preset numerical value, and the feedback information in the (P+1)-bit feedback information other than the first preset numerical value is first preset information; and the operation of sending, by the network-side device, the M CBGs may include:

sending, by the network-side device, second downlink data, wherein the second downlink data comprises the N CBGs.

In a possible design, the operation of receiving, by the network-side device, the information may include:

receiving, by the network-side device, second information, wherein the second information comprises (P+1)-bit feedback information, a second preset bit of the feedback information in the (P+1)-bit feedback information is a second preset numerical value, and the P-bit feedback information in the (P+1)-bit feedback information other than the preset bit is the acquired P-bit feedback information; and the operation of sending, by the network-side device, the M CBGs may include:

sending, by the network-side device, third downlink data, wherein the third downlink data comprises the CBGs indicated by the P-bit feedback information as being needed to be retransmitted.

In a possible design, the operation of receiving, by the network-side device, the information may include:

receiving, by the network-side device, third information, wherein the third information comprises N-bit feedback information, a bitmap correspondence relationship of the N-bit feedback information is the same as a sequence of the N CBGs of the preset transport block, the feedback information at bit positions corresponding to the P CBGs in the N-bit feedback information is the acquired P-bit feedback information, and the feedback information in the N-bit feedback information other than the P-bit feedback information is second preset information; and the operation of sending, by the network-side device, the M CBGs may include:

sending, by the network-side device, fourth downlink data, wherein the fourth downlink data comprises the CBGs indicated by the acquired P-bit feedback information as being needed to be retransmitted.

In a possible design, the operation of receiving, by the network-side device, the information may include:

receiving, by the network-side device, fourth information, wherein the fourth information comprises N-bit feedback information, a bitmap correspondence relationship of the N-bit feedback information is the same as a sequence of the N CBGs of the preset transport block, the feedback information at bit positions corresponding to the P CBGs in the N-bit feedback information is the acquired P-bit feedback information, and the feedback information in the N-bit feedback information other than the P-bit feedback information comprises third preset information; and the operation of sending, by the network-side device, the M CBGs may include:

sending, by the network-side device, fifth downlink data, wherein the fifth downlink data comprises at least one of the following: the CBGs indicated by the P-bit feedback information as being needed to be retransmitted; or, the CBGs corresponding to bits where the third preset information is located in the N-bit feedback information.

According to a third aspect, the embodiments of the disclosure provide a terminal, which has a function of implementing operations of the terminal in the method design. The function may be implemented through hardware, or may be implemented by executing corresponding software through the hardware. The hardware or the software includes one or more modules corresponding to the function.

In a possible design, the terminal includes a processor, and the processor is configured to support the terminal to implement the corresponding function in the method. Furthermore, the terminal may further include a communication interface, and the communication interface is configured to support communication between the terminal and a network-side device. Furthermore, the terminal may further include a memory, and the memory is configured to be coupled to the processor, and stores necessary program instructions and data of the terminal.

According to a fourth aspect, the embodiments of the disclosure provide a network-side device, which has a function of implementing operations of a network device in the method design. The function may be implemented through hardware, or may be implemented by executing corresponding software through the hardware. The hardware or the software includes one or more modules corresponding to the function.

In a possible design, the network-side device includes a processor, and the processor is configured to support the network-side device to implement the corresponding function in the method. Furthermore, the network-side device may further include a transceiver, and the transceiver is configured to support communication between the network-side device and the terminal. Furthermore, the network-side device may further include a memory, and the memory is configured to be coupled to the processor, and stores necessary program instructions and data of the network-side device.

According to a fifth aspect, the embodiments of the disclosure provide a terminal, which may include one or more processors, a memory, a communication interface and one or more programs. The one or more programs may be stored in the memory and configured to be executed by the one or more processors, and the programs may include instructions configured to execute the steps in any method according to the second aspect of the embodiments of the disclosure.

According to a sixth aspect, the embodiments of the disclosure provide a network-side device, which may include one or more processors, a memory, a transceiver and one or more programs. The one or more programs may be stored in the memory and configured to be executed by the one or more processors, and the programs may include instructions configured to execute the steps in any method according to the first aspect of the embodiments of the disclosure.

According to a seventh aspect, the embodiments of the disclosure provide a computer-readable storage medium, which may store a computer program for electronic data exchange, the computer program enabling a computer to execute part or all of the steps described in any method according to the second aspect of the embodiments of the disclosure.

According to an eighth aspect, the embodiments of the disclosure provide a computer-readable storage medium, which may store a computer program for electronic data exchange, the computer program enabling a computer to execute part or all of the steps described in any method according to the first aspect of the embodiments of the disclosure.

According to a ninth aspect, the embodiments of the disclosure provide a computer program product, which may include a non-transitory computer-readable storage medium storing a computer program. The computer program may be operable to enable a computer to execute part or all of the steps described in any method according to the first aspect of the embodiments of the disclosure. The computer program product may be a software installation package.

According to a tenth aspect, the embodiments of the disclosure provide a computer program product, which includes a non-transitory computer-readable storage medium storing a computer program. The computer program may be operated to enable a computer to execute part or all of the steps described in any method according to the second aspect of the embodiments of the disclosure. The computer program product may be a software installation package.

BRIEF DESCRIPTION OF DRAWINGS

The drawings given for description of the embodiments or the related art will be simply introduced below.

DETAILED DESCRIPTION

The technical solutions in the embodiments of the disclosure will be described below in combination with the drawings.

Figure 1:
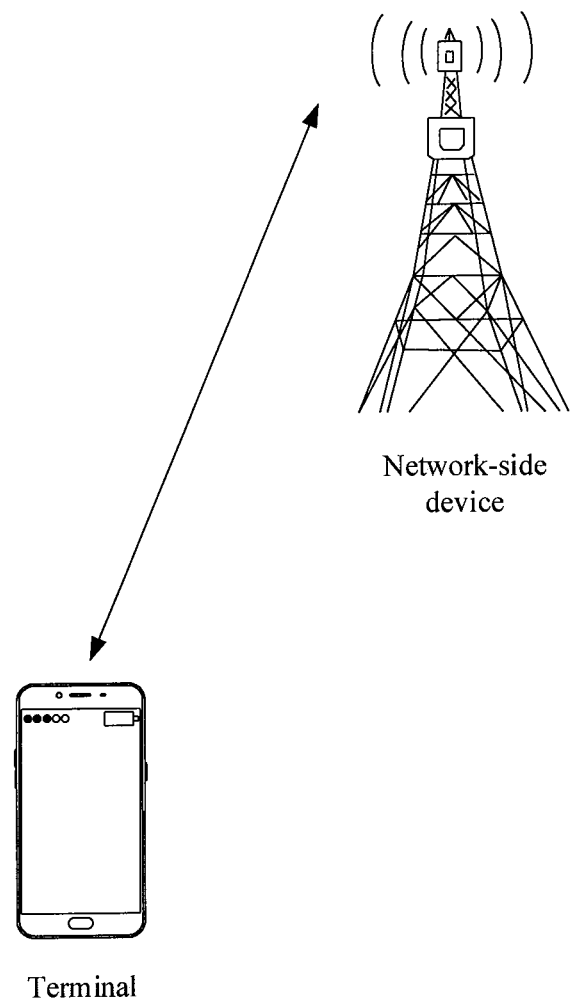
FIG. 1 illustrates a network architecture diagram of an exemplary communication system according to an embodiment of the disclosure.

Referring to FIG. 1, FIG. 1 illustrates a possible network architecture of an exemplary communication system according to an embodiment of the disclosure. The exemplary communication system may be a 4G LTE communication system or a 5G NR communication system, and specifically includes a network-side device and a terminal. When the terminal accesses a mobile communication network provided by the network-side device, the terminal may be communicatively connected with the network-side device through a wireless link. Such a communication connection manner may be a single-connection manner or a dual-connection manner or a multi-connection manner. When the communication connection manner is the single-connection manner, the network-side device may be an LTE base station or an NR base station (also called a gNB). When the communication manner is the dual-connection manner (which may specifically be implemented by a Carrier Aggregation (CA) technology or implemented by multiple network-side devices), and the terminal is connected with the multiple network-side devices, the multiple network-side devices include a Master Cell Group (MCG) and Secondary Cell Groups (SCGs), data is transmitted back between the cell groups through backhaul, the MCG may be an LTE base station and the SCG may be an LTE base station, or, the MCG may be an NR base station and the SCG may be an LTE base station, or, the MCG may be an NR base station and the SCG may be an NR base station.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connected to wireless modems, which have a wireless communication function, as well as User Equipment (UE), Mobile Stations (MSs), terminal devices and the like in various forms. For convenience of description, the devices mentioned above are collectively referred to as terminals.

Figure 2A:
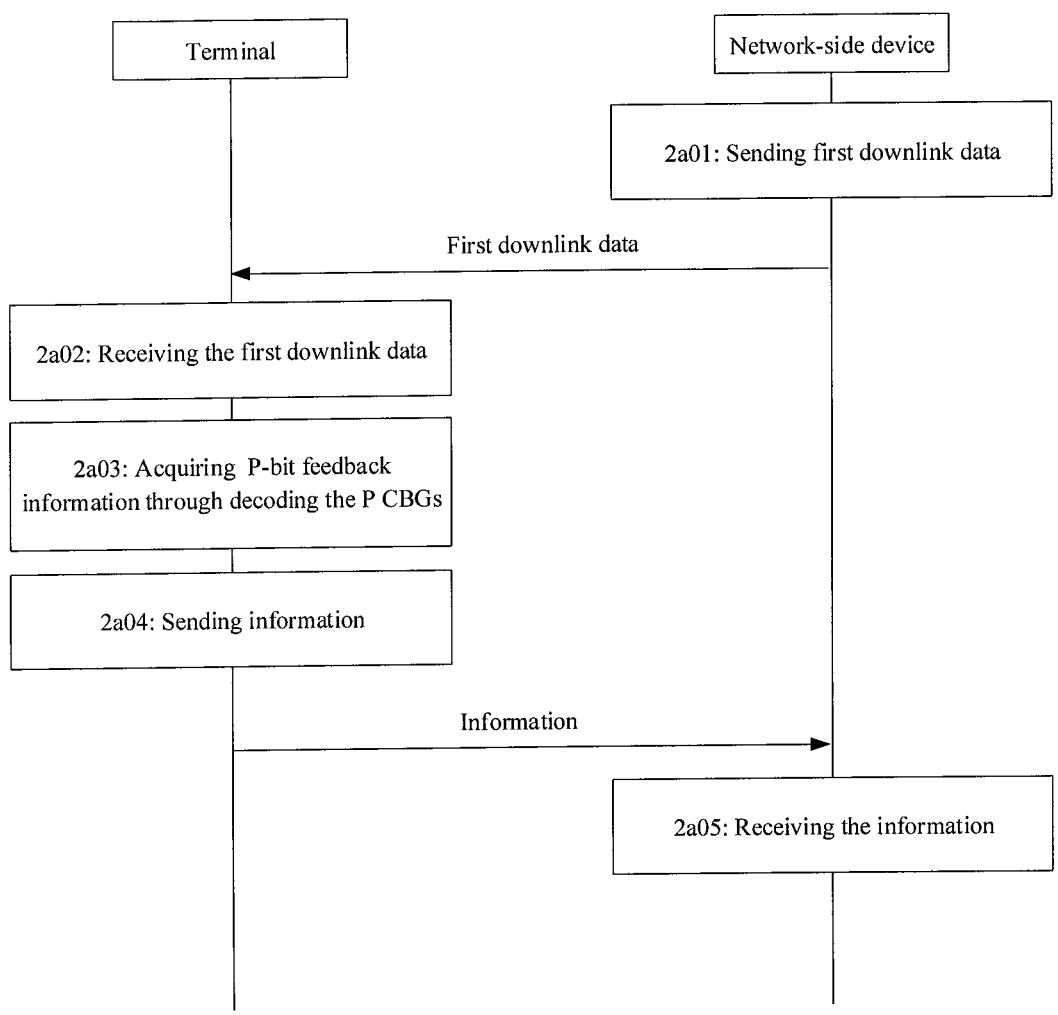
FIG. 2A illustrates a communication schematic diagram of another data retransmission control method according to an embodiment of the disclosure.

Referring to FIG. 2A, FIG. 2A illustrates a data retransmission control method according to an embodiment of the disclosure. The method includes the following operations.

In 2a01, a network-side device sends first downlink data. The first downlink data includes P CBGs in N CBGs of a preset transport block, P and N are positive integers and P is less than or equal to N.

In 2a02, a terminal receives the first downlink data. The first downlink data includes the P CBGs in the N CBGs of the preset transport block, P and N are positive integers and P is less than or equal to N.

The CBG includes at least one code block in the preset transport block. A division strategy for CBGs in the preset transport may be a random division strategy, a data volume balancing division strategy, or a specific service requirement-based division strategy, etc. There are no unique limits made to the division strategy for the CBGs in the preset transport block in the embodiment of the disclosure.

In 2a03, the terminal acquires the P-bit feedback information through decoding the P CBGs, each bit of the feedback information indicates whether the respective CBG is needed to be retransmitted.

In 2a04, the terminal sends information for notifying the network-side device to retransmit M CBGs. The M CBGs includes the CBGs which need to be retransmitted in the N CBGs. M is a positive integer and M is less than or equal to N.

In 2a05, the network-side device receives the information for notifying the network-side device to retransmit the M CBGs. The M CBGs include the CBGs, which need to be retransmitted, in the N CBGs. M is a positive integer, M is less than or equal to N, the P-bit feedback information is acquired by the terminal d the P CBGs, and each bit of the feedback information indicates whether the respective CBG is needed to be retransmitted.

It can be seen that, in the embodiments of the disclosure, the terminal transmits the N CBGs with the network-side device, the terminal receives the P CBGs and acquires the P-bit feedback information through decoding the P CBGs, and the terminal sends the information for transmitting the M CBGs including the CBGs needed to be retransmitted in the N CBGs. In this way, it may avoid loss of CBGs due to that the terminal does not effectively receive or store the CBGs in the preset transport block, while the network-side device does not retransmit the same CBGs. Therefore, it may facilitate improvement in flexibility of a wireless communication system in retransmission of the CBGs.

In a possible example, after the operation that the network-side device receives the information, the following operation is further executed: the network-side device sends the M CBGs.

After the terminal sends the information, the following operation is further executed.

The terminal receives the M CBGs.

In a possible example, the CBGs needed to be retransmitted in the N CBGs include the CBGs indicated by the P-bit feedback information as being needed to be retransmitted and/or the CBGs in the N CBGs other than the P CBGs.

Figure 2B:
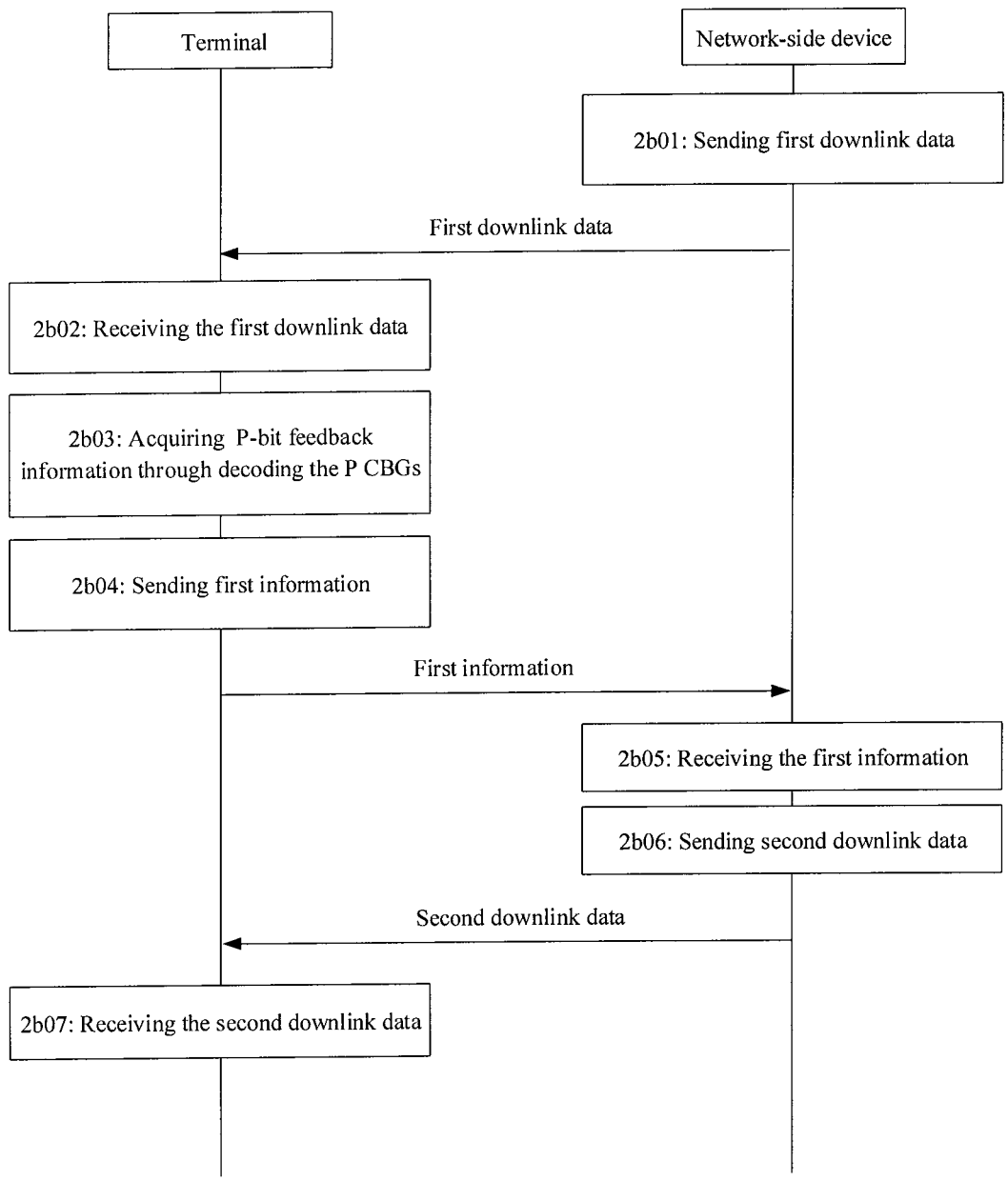
FIG. 2B illustrates a communication schematic diagram of another data retransmission control method according to an embodiment of the disclosure.

In a possible example, consistent with FIG. 2A, referring to FIG. 2B, FIG. 2B illustrates another data retransmission control method according to an embodiment of the disclosure. The method includes the following operations.

In 2b01, the network-side device sends the first downlink data. The first downlink data includes the P CBGs in the N CBGs of the preset transport block, P and N are positive integers and P is less than or equal to N.

In 2b02, the terminal receives the first downlink data. The first downlink data includes the P CBGs in the N CBGs of the preset transport block, P and N are positive integers and P is less than or equal to N.

In 2b03, the terminal acquires the P-bit feedback information through decoding the P CBGs. Each bit of the feedback information indicates whether the corresponding CBG is needed to be retransmitted.

The feedback information of a bit corresponding to a CBG needed to be retransmitted in the P-bit feedback information is a NACK, and a bit of the feedback information corresponding to a CBG not needed to be retransmitted is an ACK.

In 2b04, the terminal sends first information, the first information including (P+1)-bit feedback information, a first preset bit of the feedback information in the (P+1)-bit feedback information is a first preset numerical value, the feedback information in the (P+1)-bit feedback information other than the first preset numerical value is first preset information, and the first information is used for notifying the network-side device to retransmit the N CBGs.

In 2b05, the network-side device receives the first information, the first information including the (P+1)-bit feedback information, the feedback information of the first preset bit in the (P+1)-bit feedback information is the first preset numerical value, and the feedback information in the (P+1)-bit feedback information other than the first preset numerical value is the first preset information.

The first preset information may be, for example, NACK feedback information.

In 2b06, the network-side device sends second downlink data, the second downlink data including the N CBGs.

In 2b07, the terminal receives the second downlink data, the second downlink data including the N CBGs.

It can be seen that, in the example, the terminal transmits the N CBGs with the network-side device, the terminal receives the P CBGs, and acquires the P-bit feedback information through decoding the P CBGs, and the terminal sends the first information, the first information is used for notifying the network-side device to retransmit the N CBGs. In this way, it may avoid loss of CBGs due to that the terminal does not effectively receive or store the CBGs in the preset transport block, while the network-side device does not retransmit the same CBGs. Moreover, the first information includes the (P+1)-bit feedback information, the first preset bit of the feedback information in the (P+1)-bit feedback information is the first preset numerical value, and the feedback information in the (P+1)-bit feedback information other than the first preset numerical value is the first preset information, so that the wireless communication system provides a feedback function of retransmission of all the CBGs without any additional feedback information, thus facilitating improvement in CBG retransmission stability and efficiency of the wireless communication system.

In the possible example, the operation that the terminal sends the first information includes the following operation.

The terminal, when detecting that an available buffer space of a buffer of the terminal is smaller than a reference storage space, sends the first information, the reference storage space is a buffer space for at least one CBG indicated by the P-bit feedback information as not being needed to be retransmitted.

It can be seen that, in the example, the terminal sends the first information when the available buffer space of the buffer is smaller than the reference storage space. In this way, it may avoid loss of CBGs due to that the terminal does not have an enough buffer space for storing the CBGs, while the network-side device does not retransmit the CBGs, thus facilitating improvement in the CBG retransmission stability and efficiency of the wireless communication system.

Figure 2C:
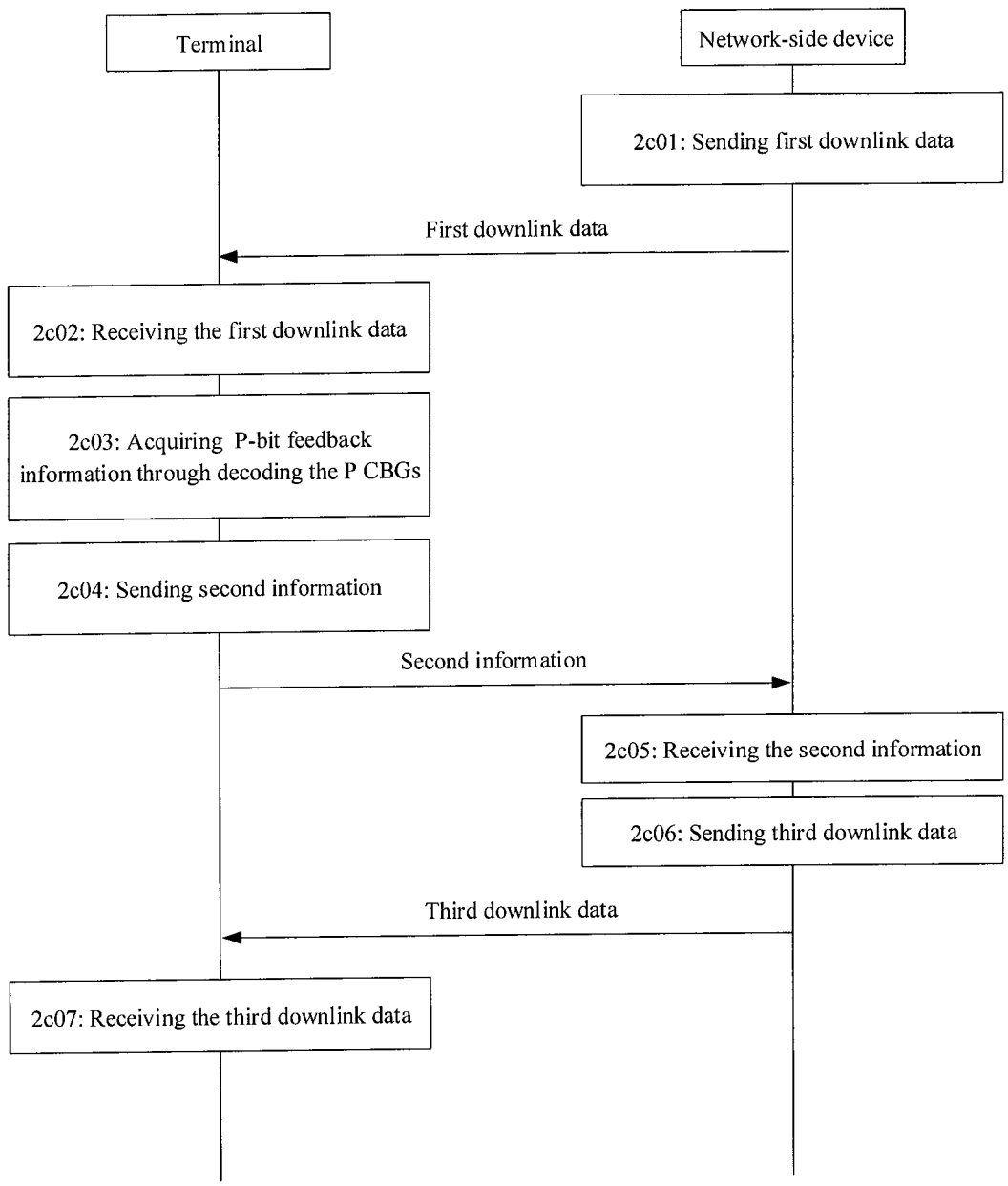
FIG. 2C illustrates a communication schematic diagram of another data retransmission control method according to an embodiment of the disclosure.

In a possible example, consistent with FIG. 2A, referring to FIG. 2C, FIG. 2C illustrates another data retransmission control method according to an embodiment of the disclosure. The method includes the following operations.

In 2c01, the network-side device sends the first downlink data. The first downlink data includes the P CBGs in the N CBGs of the preset transport block, P and N are positive integers and P is less than or equal to N.

In 2c02, the terminal receives the first downlink data. The first downlink data includes the P CBGs in the N CBGs of the preset transport block, P and N are positive integers and P is less than or equal to N.

In 2c03, the terminal acquires the P-bit feedback information through decoding the P CBGs. Each bit of the feedback information indicates whether the corresponding CBG is needed to be retransmitted.

In 2c04, the terminal sends second information. The second information includes (P+1)-bit feedback information, a second preset bit of the feedback information in the (P+1)-bit feedback information is a second preset numerical value, the P-bit feedback information in the (P+1)-bit feedback information other than the preset bit is the acquired P-bit feedback information, and the second information is used for notifying the network-side device to retransmit the CBGs indicated by the P-bit feedback information as being needed to be retransmitted.

A bit of the feedback information of corresponding to a CBG needed to be retransmitted in the P-bit feedback information is a NACK, and the feedback information of a bit corresponding to a CBG not needed to be retransmitted is an ACK. The second information is used for notifying the network-side device to retransmit the CBGs corresponding to the bits, where the feedback information is NACKs, in the P-bit feedback information.

In 2c05, the network-side device receives the second information. The second information includes the (P+1)-bit feedback information, the second preset bit of the feedback information in the (P+1)-bit feedback information is the second preset numerical value, and the P-bit feedback information in the (P+1)-bit feedback information other than the preset bit is the acquired P-bit feedback information.

In 2c06, the network-side device sends third downlink data. The third downlink data includes the CBGs indicated by the P-bit feedback information as being needed to be retransmitted.

In 2c07, the terminal receives the third downlink data. The third downlink data includes the CBGs indicated by the P-bit feedback information as being needed to be retransmitted.

It can be seen that, in the example, the terminal transmits the N CBGs with the network-side device, the terminal receives the P CBGs, and acquires the P-bit feedback information through decoding the P CBGs, and the terminal sends the second information for retransmitting the CBGs indicated by the P-bit feedback information as being needed to be retransmitted. In this way, it may avoid loss of CBGs due to that the terminal does not effectively receive or store the CBGs in the preset transport block, while the network-side device does not retransmit the same CBGs. Moreover, since a bit length of the second information is P+1, the wireless communication system provides the feedback function of retransmission of all the CBGs without any additional feedback information, thus facilitating improvement in the CBG retransmission stability and efficiency of the wireless communication system.

In the possible example, the operation that the terminal sends the second information includes the following operation.

When detecting that the available buffer space of the buffer of the terminal is more than or equal to the reference storage space, the second information is sent, the reference storage space is the buffer space for the at least one CBG indicated by the P-bit feedback information as not being needed to be retransmitted.

It can be seen that, in the example, the terminal sends the second information when the available buffer space of the buffer is more than or equal to the reference storage space. In this way, it may avoid loss of CBGs due to that the network-side device, when the terminal has an enough buffer space for storing the CBGs, retransmits the CBGs that have been correctly received by the terminal, which would cause waste of transmission resources. Thus, it facilitates improvement in the CBG retransmission efficiency of the wireless communication system.

Figure 2D:
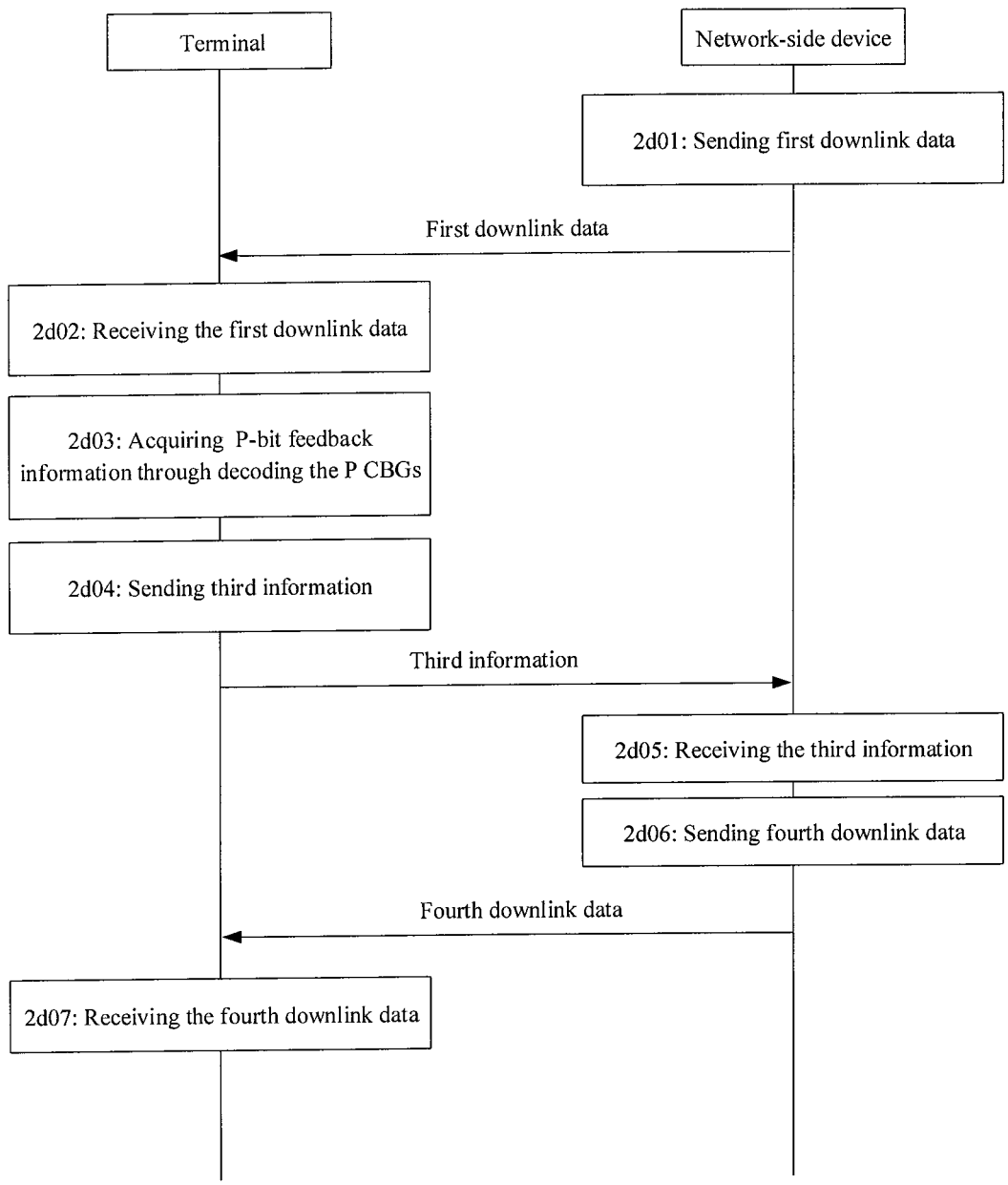
FIG. 2D illustrates a communication schematic diagram of another data retransmission control method according to an embodiment of the disclosure.

In a possible example, consistent with FIG. 2A, referring to FIG. 2D, FIG. 2D illustrates another data retransmission control method according to an embodiment of the disclosure. The method includes the following operations.

In 2d01, the network-side device sends the first downlink data. The first downlink data includes the P CBGs in the N CBGs of the preset transport block, P and N are positive integers and P is less than or equal to N.

In 2d02, the terminal receives the first downlink data. The first downlink data includes the P CBGs in the N CBGs of the preset transport block, P and N are positive integers and P is less than or equal to N.

In 2d03, the terminal acquires the P-bit feedback information through decoding the P CBGs. Each bit of the feedback information indicates whether the corresponding CBG is needed to be retransmitted.

In 2d04, the terminal sends third information. The third information includes N-bit feedback information, a bitmap correspondence relationship of the N-bit feedback information is the same as a sequence of the N CBGs in the preset transport block, the feedback information at bit positions corresponding to the P CBGs in the N-bit feedback information is the acquired P-bit feedback information, the feedback information in the N-bit feedback information other than the P-bit feedback information is second preset information, and the third information is used for notifying the network-side device to retransmit the CBGs indicated by the acquired P-bit feedback information as being needed to be retransmitted.

The second preset information may be, for example, an ACK.

The feedback information of a bit corresponding to a CBG needed to be retransmitted in the P-bit feedback information is a NACK, and a bit of the feedback information corresponding to a CBG not needed to be retransmitted is an ACK. The third information is used for notifying the network-side device to retransmit the CBGs corresponding to the bits where the feedback information is NACKs in the P-bit feedback information.

In 2d05, the network-side device receives the third information. The third information includes the N-bit feedback information, the bitmap correspondence relationship of the N-bit feedback information is the same as the sequence of the N CBGs in the preset transport block, the feedback information at the bit positions corresponding to the P CBGs in the N-bit feedback information is the acquired P-bit feedback information and the feedback information in the N-bit feedback information other than the P-bit feedback information is the second preset information.

In 2d06, the network-side device sends fourth downlink data. The fourth downlink data includes the CBGs indicated by the acquired P-bit feedback information as being needed to be retransmitted.

In 2d07, the terminal receives the fourth downlink data. The fourth downlink data includes the CBGs indicated by the acquired P-bit feedback information as being needed to be retransmitted.

It can be seen that, in the example, the terminal transmits the N CBGs with the network-side device, the terminal receives the P CBGs and acquires the P-bit feedback information through decoding the P CBGs, and the terminal sends the third information, the third information is used for retransmitting the CBGs indicated by the P-bit feedback information as being needed to be retransmitted. In this way, it may avoid loss of CBGs due to that the terminal does not effectively store the CBGs needed to be retransmitted while the network-side device does not retransmit the CBGs. Moreover, since a bit length of the third information is N, the wireless communication system provides the feedback function of retransmission of all the CBGs without any additional feedback information, thus facilitating improvement in the CBG retransmission stability and efficiency of the wireless communication.

In the possible example, the operation that the terminal sends the third information includes the following operation.

The terminal, when detecting that the available buffer space of the buffer of the terminal is more than or equal to the reference storage space, sends the third information, the reference storage space is the buffer space for the at least one CBG indicated by the P-bit feedback information as not being needed to be retransmitted.

It can be seen that, in the example, the terminal sends the third information when the available buffer space of the buffer is more than or equal to the reference storage space. In this way, it may avoid waste of transmission resources due to that the network-side device, when the terminal has an enough buffer space for storing the CBGs, retransmits the CBGs that have been correctly received by the terminal, thus facilitating improvement in the CBG retransmission efficiency of the wireless communication system.

Figure 2E:
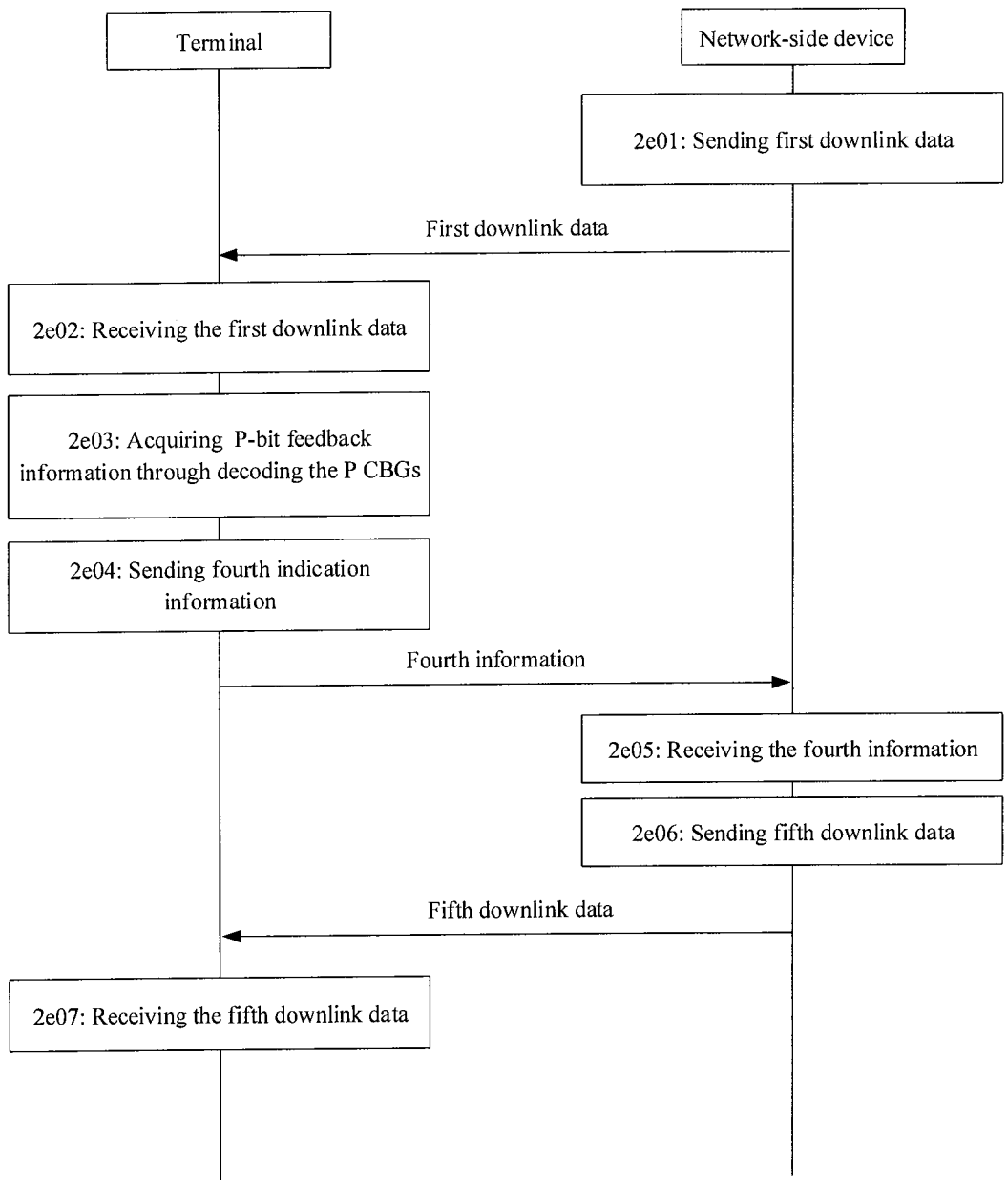
FIG. 2E illustrates a communication schematic diagram of another data retransmission control method according to an embodiment of the disclosure.

In a possible example, consistent with FIG. 2A, referring to FIG. 2E, FIG. 2E illustrates a data retransmission control method according to an embodiment of the disclosure. The method includes the following operations.

In 2e01, the network-side device sends the first downlink data. The first downlink data includes the P CBGs in the N CBGs of the preset transport block, P and N are positive integers and P is less than or equal to N.

In 2e02, the terminal receives the first downlink data. The first downlink data includes the P CBGs in the N CBGs of the preset transport block, P and N are positive integers and P is less than or equal to N.

In 2e03, the terminal acquires the P-bit feedback information through decoding the P CBGs. Each bit of the feedback information indicates whether the corresponding CBG is needed to be retransmitted.

In 2e04, the terminal sends fourth information. The fourth information includes N-bit feedback information, a bitmap correspondence relationship of the N-bit feedback information is the same as the sequence of the N CBGs in the preset transport block, the feedback information at bit positions corresponding to the P CBGs in the N-bit feedback information is the acquired P-bit feedback information, the feedback information in the N-bit feedback information other than the P-bit feedback information is third preset information, and the fourth information is used for notifying the network-side device to retransmit the CBGs indicated by the P-bit feedback information as being needed to be retransmitted and/or the CBGs corresponding to bits where the third preset information is located in the N-bit feedback information.

The third preset information may be a NACK.

The feedback information of a bit corresponding to a CBG needed to be retransmitted in the P-bit feedback information is a NACK, and the feedback information of a bit corresponding to a CBG not needed to be retransmitted is an ACK.

In 2e05, the network-side device receives the fourth information. The fourth information includes the N-bit feedback information, the bitmap correspondence relationship of the N-bit feedback information is the same as the sequence of the N CBGs in the preset transport block, the feedback information at the bit positions corresponding to the P CBGs in the N-bit feedback information is the acquired P-bit feedback information, and the feedback information in the N-bit feedback information other than the P-bit feedback information includes the third preset information.

In 2e06, the network-side device sends fifth downlink data. The fifth downlink data includes the CBGs indicated by the P-bit feedback information as being needed to be retransmitted and/or the CBGs corresponding to bits where the third preset information is located in the N-bit feedback information.

In 2e07, the terminal receives the fifth downlink data. The fifth downlink data includes the CBGs indicated by the P-bit feedback information as being needed to be retransmitted and/or the CBGs corresponding to the bits where the third preset information is located in the N-bit feedback information.

It can be seen that, in the example, the terminal transmits the N CBGs with the network-side device, the terminal receives the P CBGs and acquires the P-bit feedback information through decoding the P CBGs, and the terminal sends the fourth information, the fourth information is used for retransmitting the CBGs indicated by the P-bit feedback information as being needed to be retransmitted and/or the CBGs corresponding to the bits where the third preset information is located in the N-bit feedback information. In this way, it may avoid loss of CBGs due to that the network-side device, when the terminal does not receive or store the CBGs of the preset transport block, does not retransmit the CBGs. Moreover, since a bit length of the fourth information is N, the wireless communication system provides the feedback function of retransmission of all the CBGs without any additional feedback information, thus facilitating improvement in the CBG retransmission stability and efficiency of the wireless communication system.

The embodiments of the disclosure will specifically be described below in combination with specific application scenarios.

Figure 3A:
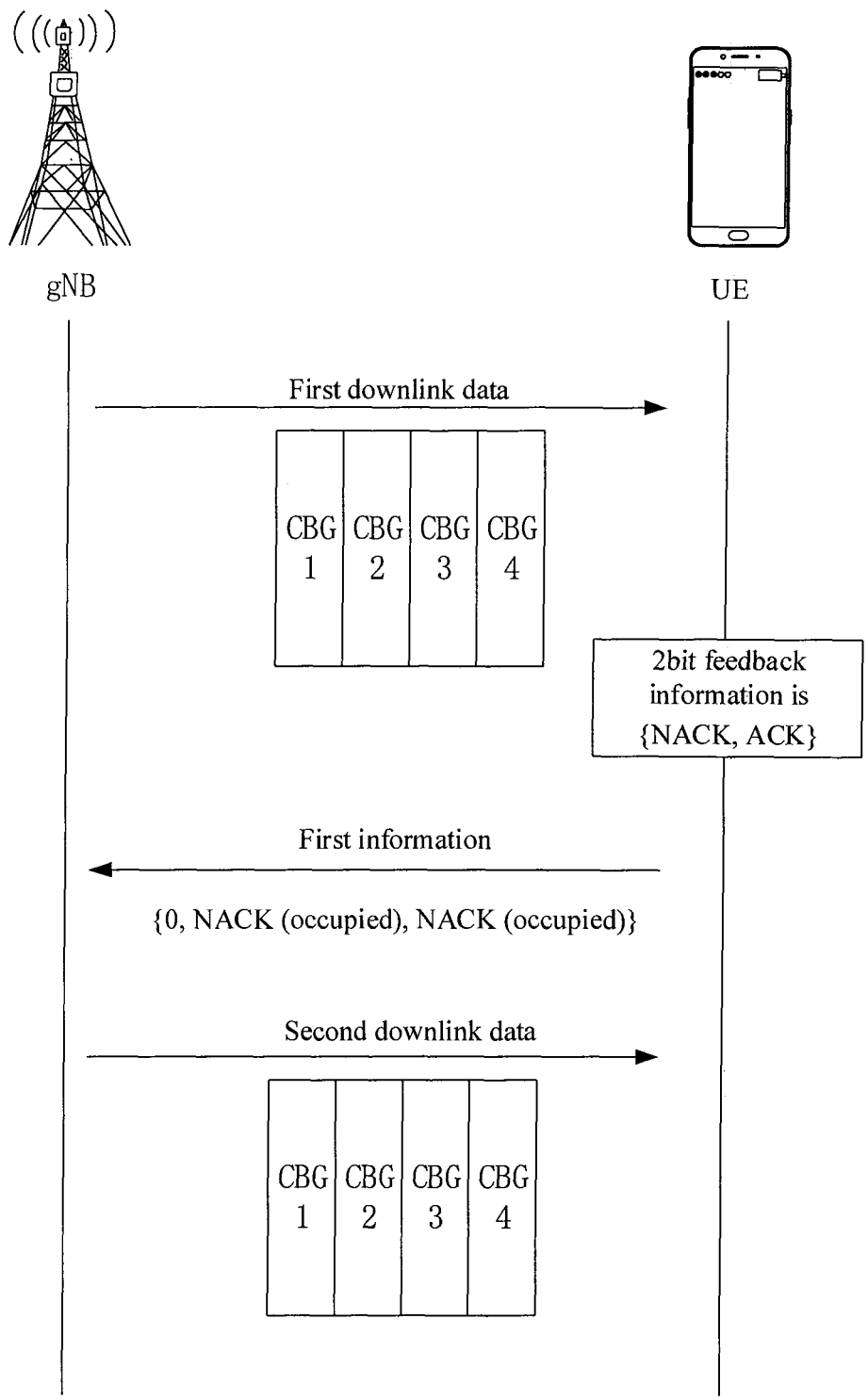
FIG. 3A illustrates a schematic diagram of a data retransmission control method in a 5G NR scenario according to an embodiment of the disclosure.

Referring to FIG. 3A, the network-side device is a gNB in a 5G NR system, the terminal is a UE in the 5G NR system, the preset transport block is an eMBB service data transport block, and the preset transport block includes four CBGs, i.e., sequentially CBG1, CBG2, CBG3 and CBG4 respectively. The first downlink data received by the terminal includes two CBGs, i.e., CBG2 and CBG3, the decoding operation is performed on the two CBGs, CBG2 is incorrectly decoded, CBG3 is correctly decoded, and thus 2-bit feedback information {NACK, ACK} is acquired. The reference storage space is a buffer space for CBG3, the present available buffer space of the buffer of the terminal is smaller than the reference storage space, P (2) is smaller than N (4), a preset bit length is the first bit, the first preset numerical value is 0, and the first preset information is NACK (the first preset information is configured for occupation). As illustrated in the figure, the UE sends the first information to the gNB, where the first information is {0, NACK (occupied), NACK (occupied)} (it is noted that the first bit "0" is a practically transmitted symbol and the last two bits "NACK" are bearer information and may specifically be mapped into 0 or 1 for transmission), and the gNB, after receiving the first information, sends the second downlink data to the UE, where the second downlink data includes CBG1, CBG2, CBG3 and CBG4.

Figure 3B:
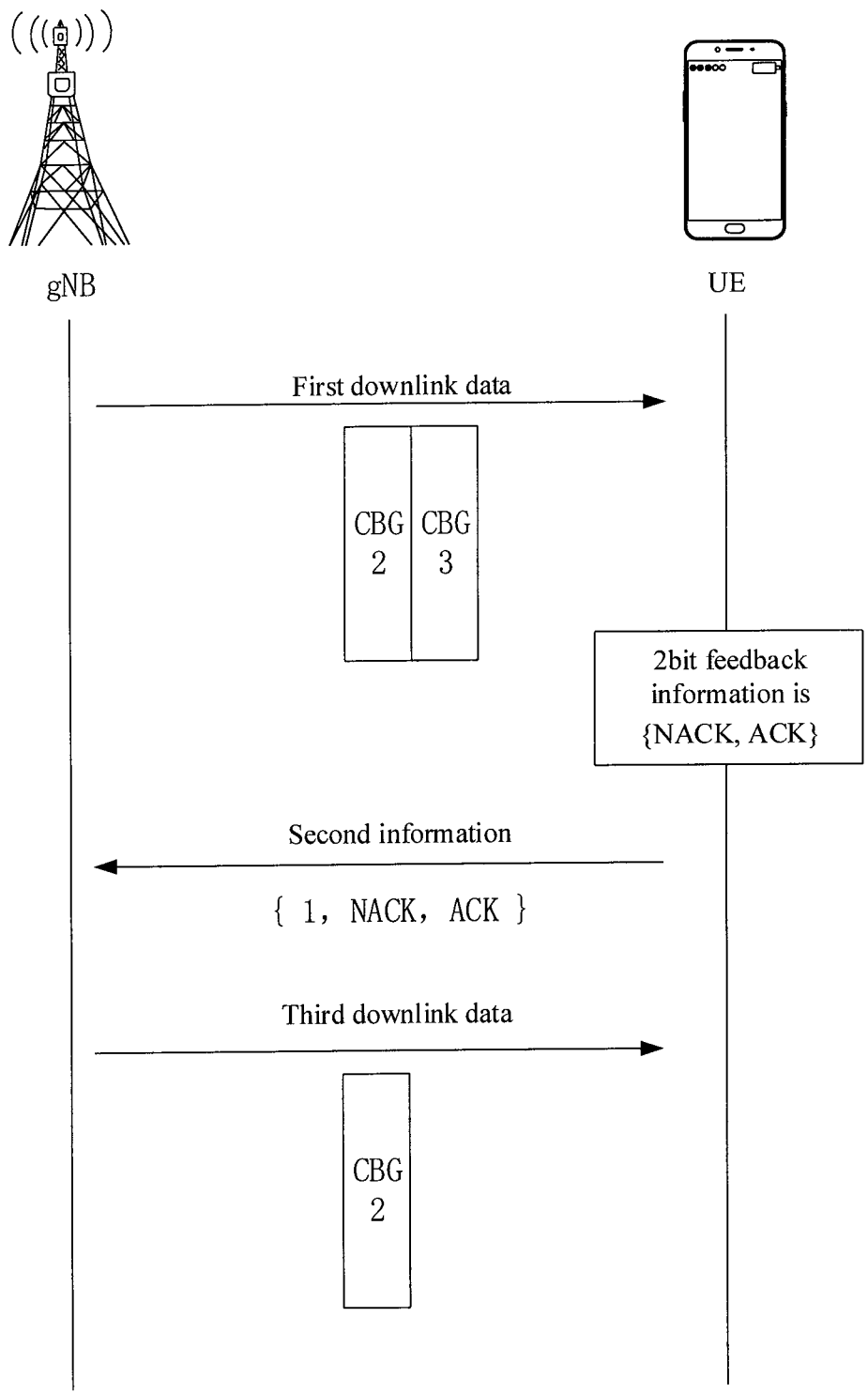
FIG. 3B illustrates a schematic diagram of a data retransmission control method in a 5G NR scenario according to another embodiment of the disclosure.

Referring to FIG. 3B, the network-side device is a gNB in the 5G NR system, the terminal is a UE in the 5G NR system, the preset transport block is an eMBB service data transport block, and the preset transport block includes four CBGs, i.e., sequentially CBG1, CBG2, CBG3 and CBG4 respectively. The first downlink data received by the terminal includes two CBGs, i.e., CBG2 and CBG3, and the decoding operation is performed on the two CBGs, CBG2 is incorrectly decoded, CBG3 is correctly decoded, and thus 2 bit feedback information {NACK, ACK} is acquired. The reference storage space is a buffer space for CBG1 and CBG4, the present available buffer space of the buffer of the terminal is larger than the reference storage space, P (2) is smaller than N (4), the preset bit length is the first bit, the first preset numerical value is 0, and the second preset information is 1. As illustrated in the figure, the UE sends the second information to the gNB, the second information is {1, NACK, ACK} (it is noted that the first bit "1" is a practically transmitted symbol and the last two bits "NACK" and "ACK" are bearer information and may specifically be mapped into 0 or 1 for transmission), and the gNB, after receiving the second information, sends the third downlink data to the UE, where the third downlink data includes CBG2.

Figure 3C:
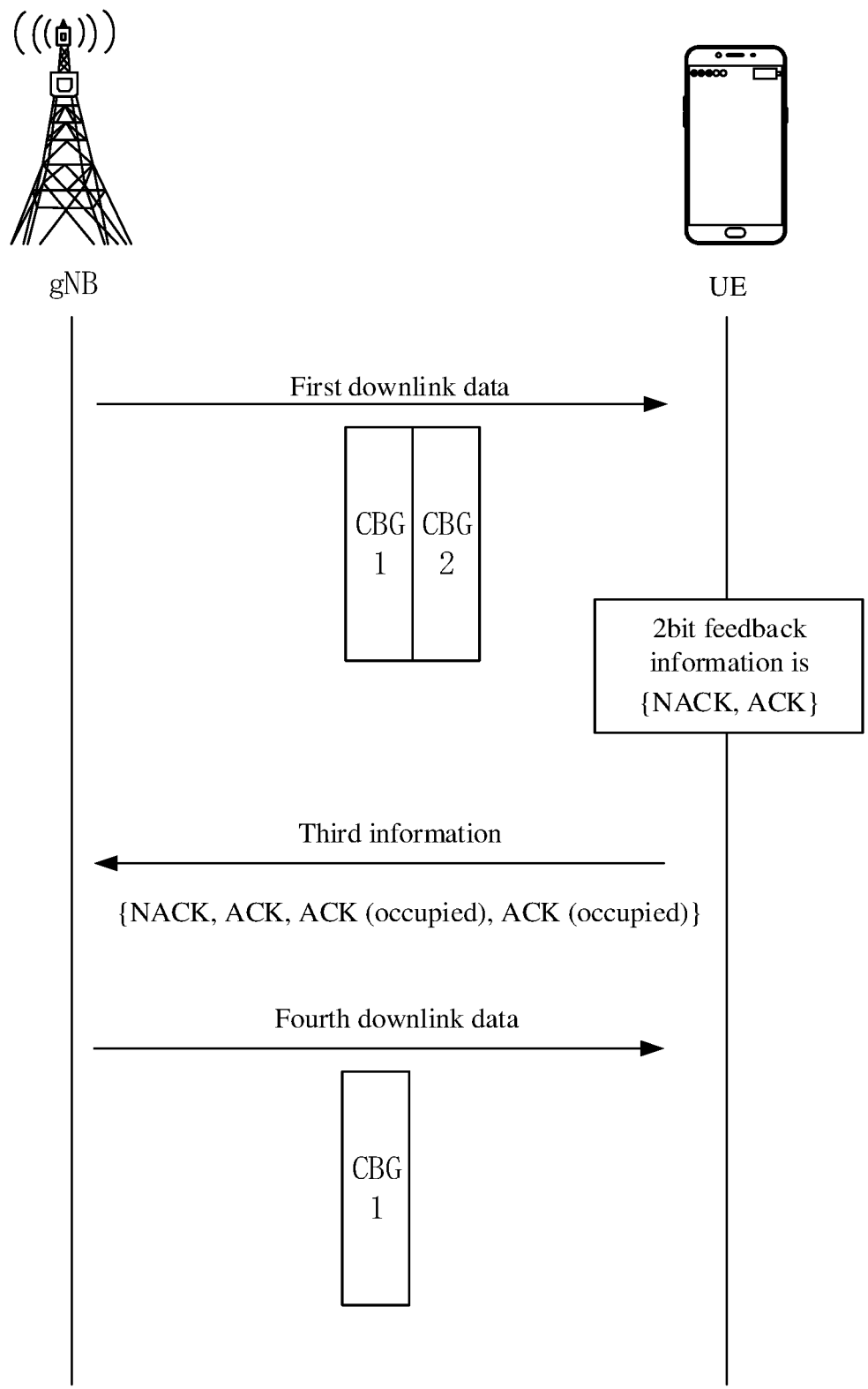
FIG. 3C illustrates a schematic diagram of a data retransmission control method in a 5G NR scenario according to another embodiment of the disclosure.

Referring to FIG. 3C, the network-side device is a gNB in a 5G NR system, the terminal is a UE in a 5G NR system, the preset transport block is an eMBB service data transport block, and the preset transport block includes four CBGs, i.e., sequentially CBG1, CBG2, CBG3 and CBG4 respectively. The first downlink data received by the terminal includes two CBGs, CBG1 and CBG2, and the decoding operation is performed on the two CBGs. CBG1 is incorrectly decoded, CBG2 is correctly decoded, and thus 2bit feedback information {NACK, ACK} is acquired. The reference storage space is a buffer space for CBG3 and CBG4, the present available buffer space of the buffer of the terminal is equal to the reference storage space, P (2) is smaller than N (4), and the second preset information is ACK (the second preset information is configured for occupation). As illustrated in the figure, the UE sends the third information to the gNB, the third information is {NACK, ACK, ACK(occupied), ACK(occupied)}, and the gNB, after receiving the third information, sends the fourth downlink data to the UE, where the fourth downlink data includes CBG1.

Figure 3D:
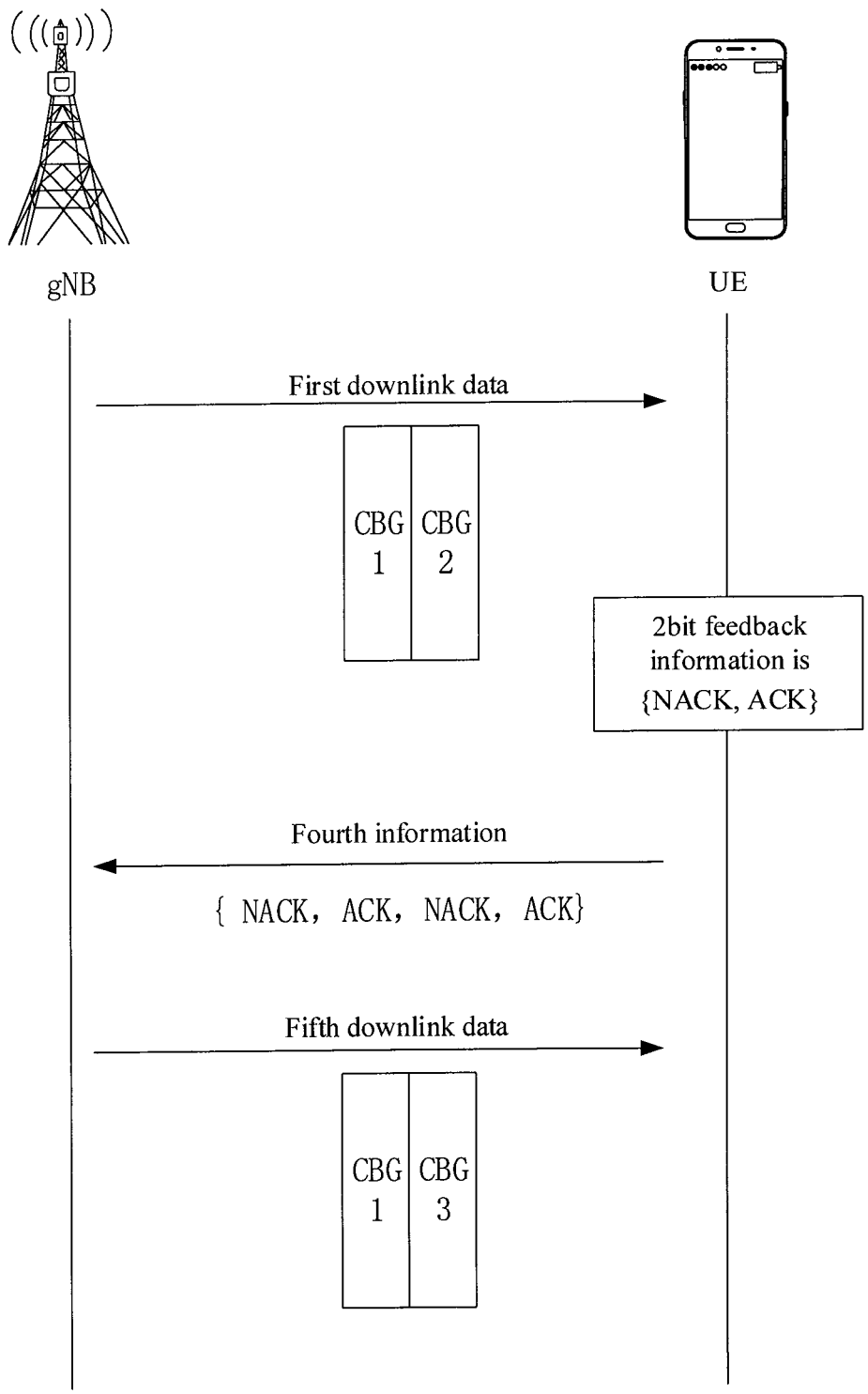
FIG. 3D illustrates a schematic diagram of a data retransmission control method in a 5G NR scenario according to another embodiment of the disclosure.

Referring to FIG. 3D, the network-side device is a gNB in the 5G NR system, the terminal is UE in the 5G NR system, the preset transport block is an eMBB service data transport block, and the preset transport block includes four CBGs, i.e., sequentially CBG1, CBG2, CBG3 and CBG4 respectively. The first downlink data received by the terminal includes two CBGs, i.e., CBG1 and CBG2, and the decoding operation is performed on the two CBGs, CBG1 is incorrectly decoded, CBG2 is correctly decoded, and thus 2 bit feedback information {NACK, ACK} is acquired. The UE sends the fourth information to the gNB, the fourth information is {NACK, ACK, NACK, ACK}, and the gNB, after receiving the fourth information, sends the fifth downlink data to the UE, where the fifth downlink data includes CBG1 and CBG3.

Figure 3E:
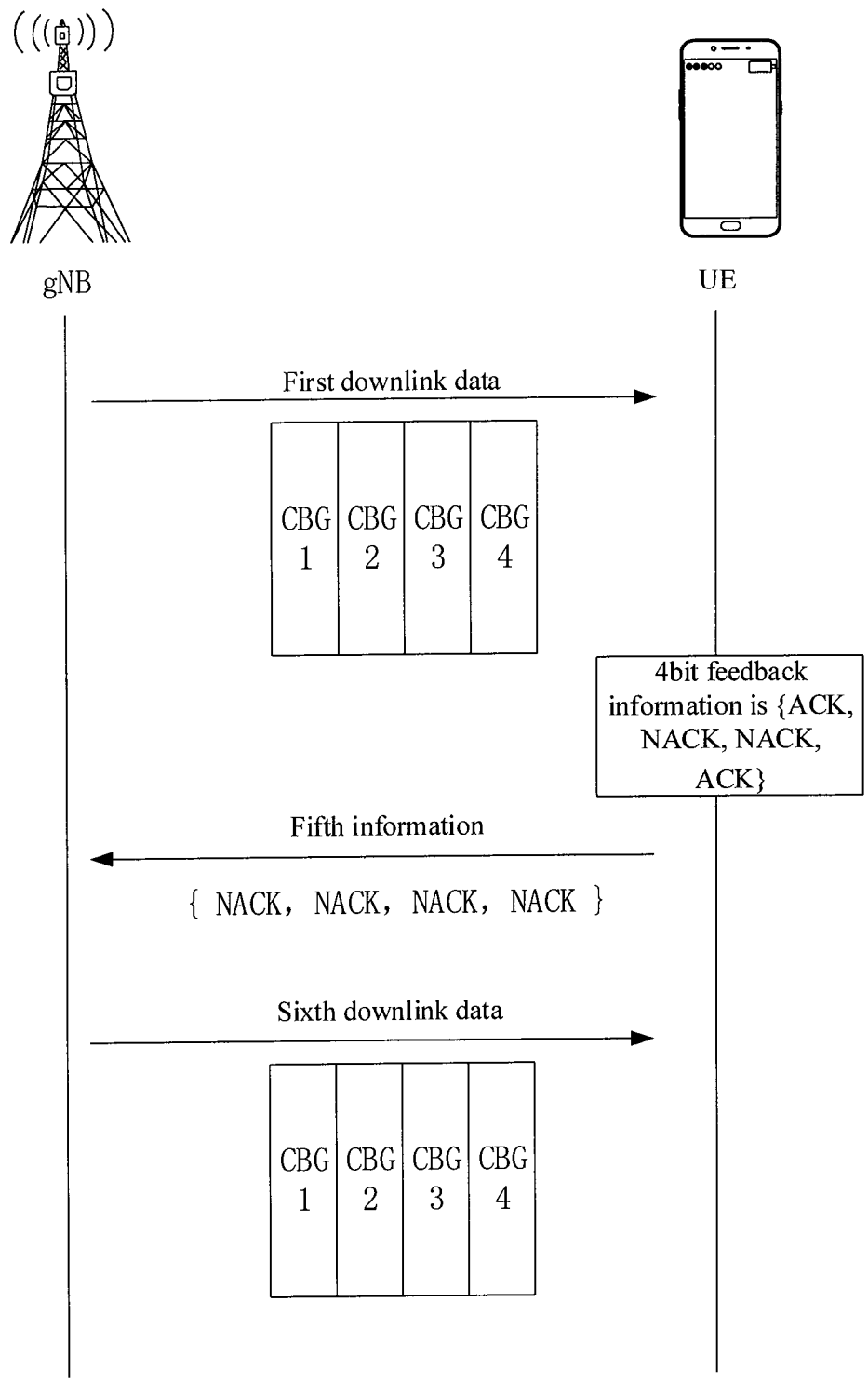
FIG. 3E illustrates a schematic diagram of a data retransmission control method in a 5G NR scenario according to another embodiment of the disclosure.

Referring to FIG. 3E, the network-side device is a gNB in the 5G NR system, the terminal is UE in the 5G NR system, the preset transport block is an eMBB service data transport block, and the preset transport block includes four CBGs, i.e., sequentially CBG1, CBG2, CBG3 and CBG4 respectively. The first downlink data received by the terminal includes the four CBGs, and the decoding operation is performed on the four CBGs, CBG2 and CBG3 are incorrectly decoded, CBG1 and CBG4 are correctly decoded, and thus 4 bit feedback information {ACK, NACK, NACK, ACK} is acquired. The reference storage space is a buffer space for CBG1 and CBG4, the present available buffer space of the buffer of the terminal is smaller than the reference storage space, and P=N=4. As illustrated in the figure, the UE sends fifth information to the gNB, the fifth information is {NACK, NACK, NACK, NACK}, and the gNB, after receiving the fifth information, sends sixth downlink data to the UE, the sixth downlink data including CBG1, CBG2, CBG3 and CBG4.

Figure 3F:
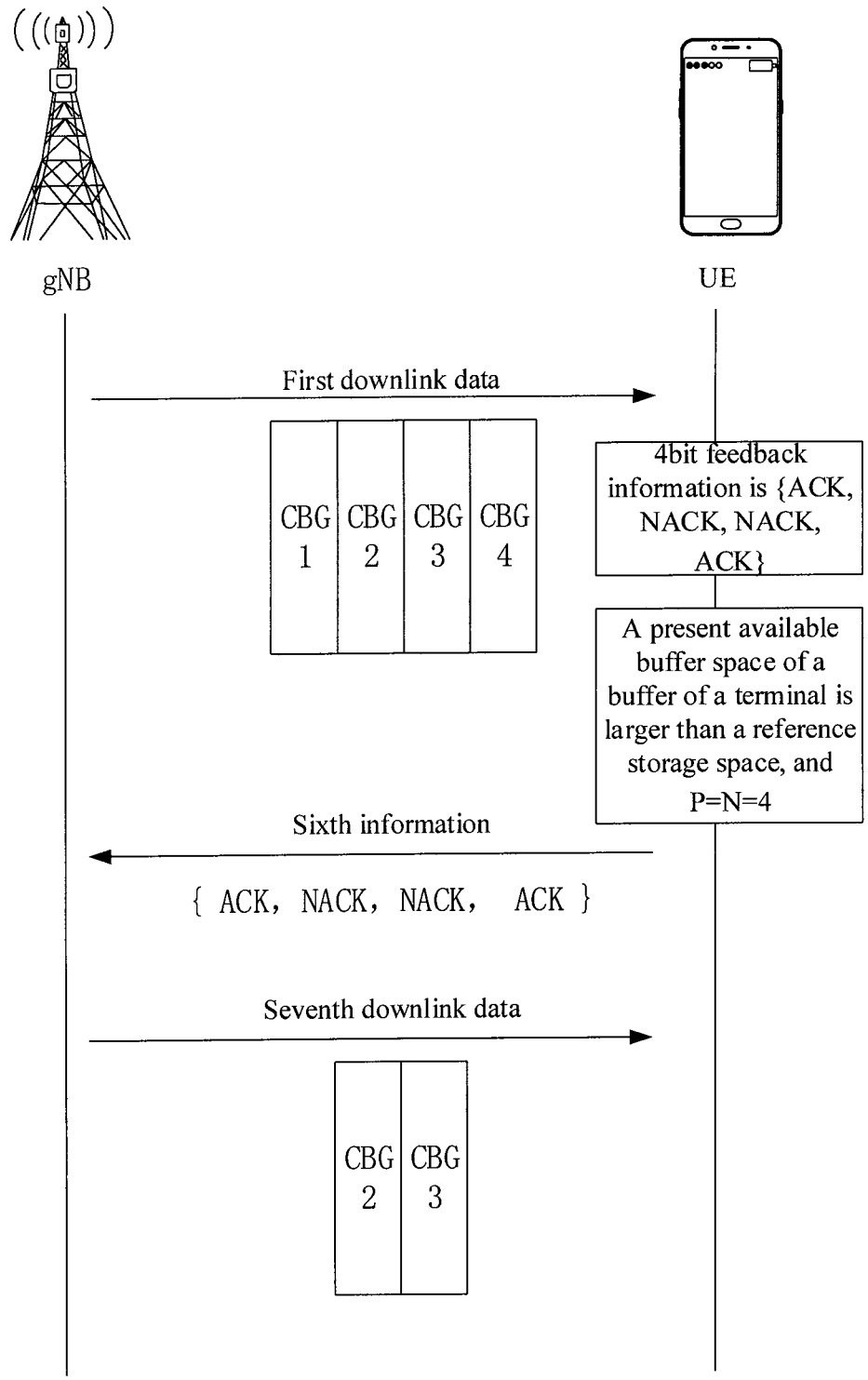
FIG. 3F illustrates a schematic diagram of a data retransmission control method in a 5G NR scenario according to another embodiment of the disclosure.

Referring to FIG. 3F, the network-side device is a gNB in the 5G NR system, the terminal is UE in the 5G NR system, the preset transport block is an eMBB service data transport block, and the preset transport block includes four CBGs, i.e., sequentially CBG1, CBG2, CBG3 and CBG4 respectively. The first downlink data received by the terminal includes the four CBGs, and the decoding operation is performed on the four CBGs, CBG2 and CBG3 are incorrectly decoded, CBG1 and CBG4 are correctly decoded, and thus 4 bit feedback information {ACK, NACK, NACK, ACK} is acquired. The reference storage space is a buffer space for CBG1 and CBG4, the present available buffer space of the buffer of the terminal is larger than the reference storage space, and P=N=4. As illustrated in the figure, the UE sends sixth information to the gNB, the sixth information is {ACK, NACK, NACK, ACK}, and the gNB, after receiving the sixth information, sends seventh downlink data to the UE, where the seventh downlink data includes CBG2 and CBG3.

Figure 4:
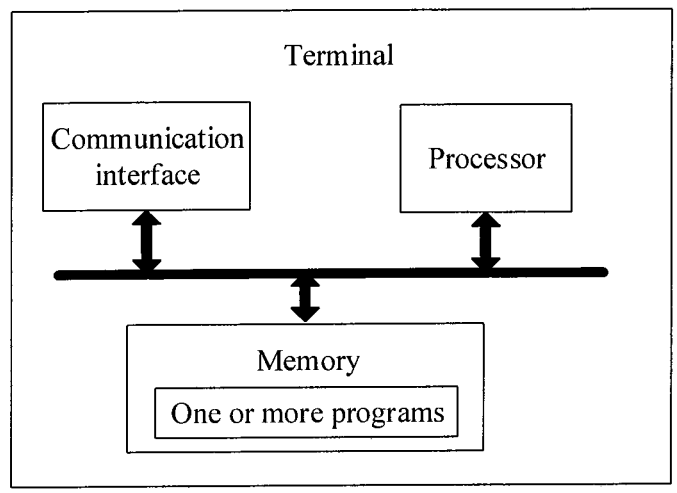
FIG. 4 illustrates a block diagram of a terminal according to an embodiment of the disclosure.

Consistent with the embodiments illustrated in FIG. 2A to FIG. 2E, referring to FIG. 4, FIG. 4 is a block diagram of a terminal according to an embodiment of the disclosure. As illustrated in the figure, the terminal includes one or more processors, a memory, a communication interface and one or more programs. The one or more programs are stored in the memory and configured to be executed by the one or more processors. The programs include instructions configured to execute the following steps.

First downlink data is received. The first downlink data includes P CBGs in N CBGs of a preset transport block, P and N are positive integers and P is less than or equal to N.

The P-bit feedback information is acquired through a decoding operation on the P CBGs, each bit of the feedback information indicates whether the corresponding CBG is needed to be retransmitted.

Information is sent, the information is used for notifying a network-side device to retransmit M CBGs. The M CBGs include the CBGs needed to be retransmitted in the N CBGs, M is a positive integer and M is less than or equal to N.

It can be seen that, in the embodiments of the disclosure, the terminal transmits the N CBGs with the network-side device, the terminal receives the P CBGs and acquires the P-bit feedback information through decoding the P CBGs, and the terminal sends the information for transmitting the M CBGs including the CBGs needed to be retransmitted in the N CBGs. In this way, it may avoid loss of CBGs due to that so the network-side device, when the terminal does not effectively receive or store the CBGs in the preset transport block, does not retransmit. Thus, it facilitates improvement in flexibility of a wireless communication system in retransmission of the CBGs.

In a possible example, the programs further include instructions for executing the following step: after the information is sent, the M CBGs are received.

In a possible example, the CBGs needed to be retransmitted in the N CBGs include the CBGs indicated by the P-bit feedback information as being needed to be retransmitted and/or the CBGs in the N CBGs other than the P CBGs.

In a possible example, in terms of sending the information, the instructions in the programs are specifically configured to send first information. the first information including (P+1)-bit feedback information, the feedback information of a first preset bit in the (P+1)-bit feedback information is a first preset numerical value, the feedback information in the (P+1)-bit feedback information other than the first preset numerical value is first preset information and the first information is used for notifying the network-side device to retransmit the N CBGs.

In terms of receiving the M CBGs, the instructions in the programs are specifically configured to execute receive second downlink data. The second downlink data includes the N CBGs.

In a possible example, in terms of sending the information, the instructions in the programs are specifically configured to send second information. The second information includes (P+1)-bit feedback information, the feedback information of a second preset bit in the (P+1)-bit feedback information is a second preset numerical value, the P-bit feedback information in the (P+1)-bit feedback information other than the preset bit is the acquired P-bit feedback information, and the second information is used for notifying the network-side device to retransmit the CBGs indicated by the P-bit feedback information as being needed to be retransmitted.

In terms of receiving the M CBGs, the instructions in the programs are specifically configured to receive third downlink data. The third downlink data includes the CBGs indicated by the P-bit feedback information as being needed to be retransmitted.

In a possible example, in terms of sending the information, the instructions in the programs are specifically configured to send third information. The third information includes N-bit feedback information, a bitmap correspondence relationship of the N-bit feedback information is the same as a sequence of the N CBGs of the preset transport block, the feedback information at bit positions corresponding to the P CBGs in the N-bit feedback information is the acquired P-bit feedback information, the feedback information in the N-bit feedback information other than the P-bit feedback information is second preset information, and the third information is used for notifying the network-side device to retransmit the CBGs indicated by the acquired P-bit feedback information as being needed to be retransmitted.

In terms of receiving the M CBGs, the instructions in the programs are specifically configured to receive fourth downlink data. The fourth downlink data includes the CBGs indicated by the P-bit feedback information as being needed to be retransmitted.

In a possible example, in terms of sending the information, the instructions in the programs are specifically configured to send fourth information. The fourth information includes N-bit feedback information, a bitmap correspondence relationship of the N-bit feedback information is the same as the sequence of the N CBGs of the preset transport block, the feedback information at bit positions corresponding to the P CBGs in the N-bit feedback information is the acquired P-bit feedback information, the feedback information in the N-bit feedback information other than the P-bit feedback information is third preset information, and the fourth information is used for notifying the network-side device to retransmit the CBGs indicated by the P-bit feedback information as being needed to be retransmitted and/or the CBGs corresponding to bits where the third preset information is located in the N-bit feedback information.

In terms of receiving the M CBGs, the instructions in the programs are specifically configured to receive fifth downlink data. The fifth downlink data includes the CBGs indicated by the P-bit feedback information as being needed to be retransmitted and/or the CBGs corresponding to the bits where the third preset information is located in the N-bit feedback information.

Figure 5:
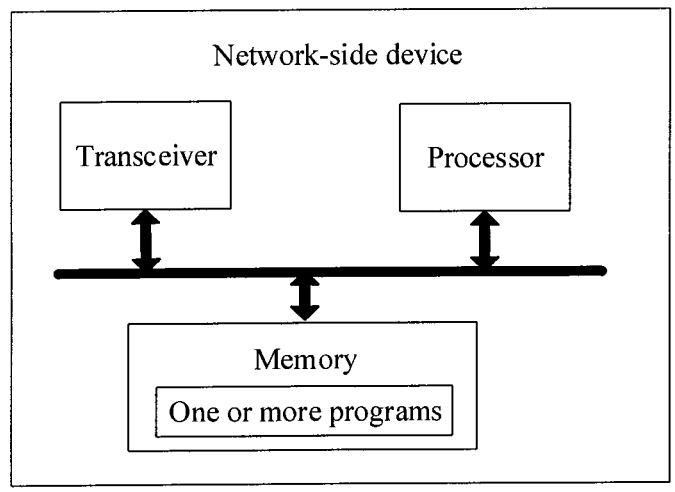
FIG. 5 illustrates a block diagram of a network-side device according to an embodiment of the disclosure.

Consistent with the embodiments illustrated in FIG. 2A and FIG. 2D, referring to FIG. 5, FIG. 5 illustrates a block diagram of a network-side device according to an embodiment of the disclosure. As illustrated in the figure, the network-side device includes one or more processors, a memory, a transceiver and one or more programs. The one or more programs are stored in the memory and configured to be executed by the one or more processors. The programs include instructions configured to execute the following steps.

First downlink data is sent. The first downlink data includes P CBGs in N CBGs of a preset transport block, where P and N are positive integers and P is less than or equal to N.

Information for notifying the network-side device to retransmit M CBGs is received. The M CBGs include the CBGs needed to be retransmitted in the N CBGs, M is a positive integer, M is less than or equal to N, P-bit feedback information is acquired from a terminal performing a decoding operation on the P CBGs, and each bit of the feedback information indicates whether the respective CBG is needed to be retransmitted.

It can be seen that, in the embodiment of the disclosure, the terminal transmits the N CBGs with the network-side device, the terminal receives the P CBGs and acquires the P-bit feedback information through decoding the P CBGs, and the terminal sends the information for transmitting the M CBGs including the CBGs needed to be retransmitted in the N CBGs. In this way, it may avoid loss of CBGs due to that the terminal does not effectively receive or store the CBGs in the preset transport block, while the network-side device does not retransmit the CBGs. Therefore, it may facilitate improvement in flexibility of a wireless communication system in retransmission of the CBGs.

In a possible example, the programs further include instructions for sending the M CBGs after the information is received.

In a possible example, the CBGs needed to be retransmitted in the N CBGs include: the CBGs indicated by the P-bit feedback information as being needed to be retransmitted and/or the CBGs in the N CBGs other than the P CBGs.

In a possible example, in terms of receiving the information, the instructions in the programs are specifically configured to receive first information, the first information includes (P+1)-bit feedback information, a first preset bit of the feedback information in the (P+1)-bit feedback information is a first preset numerical value, and the feedback information in the (P+1)-bit feedback information other than the first preset numerical value is first preset information.

In terms of sending the M CBGs, the instructions in the programs are specifically configured to send second downlink data, the second downlink data includes the N CBGs.

In a possible example, in terms of receiving the information, the instructions in the programs are specifically configured to receive second information, the second information includes (P+1)-bit feedback information, a second preset bit of the feedback information in the (P+1)-bit feedback information is a second preset numerical value, and the P-bit feedback information in the (P+1)-bit feedback information other than the preset bit is the acquired P-bit feedback information.

In terms of sending the M CBGs, the instructions in the programs are specifically configured to send third downlink data, the third downlink data includes the CBGs indicated by the P-bit feedback information as being needed to be retransmitted.

In a possible example, in terms of receiving the information, the instructions in the programs are specifically configured to receive third information, the third information includes N-bit feedback information, a bitmap correspondence relationship of the N-bit feedback information is the same as a sequence of the N CBGs of the preset transport block, the feedback information at bit positions corresponding to the P CBGs in the N-bit feedback information is the acquired P-bit feedback information, and the feedback information in the N-bit feedback information other than the P-bit feedback information is second preset information.

In terms of sending the M CBGs, the instructions in the programs are specifically configured to send fourth downlink data, the fourth downlink data includes the CBGs indicated by the P-bit feedback information as being needed to be retransmitted.

In a possible example, in terms of receiving the information, the instructions in the programs are specifically configured to receive fourth information, the fourth information includes N-bit feedback information, a bitmap correspondence relationship of the N-bit feedback information is the same as the sequence of the N CBGs of the preset transport block, the feedback information at bit positions corresponding to the P CBGs in the N-bit feedback information is the acquired P-bit feedback information, and the feedback information in the N-bit feedback information other than the P-bit feedback information is third preset information.

In terms of sending the M CBGs, the instructions in the programs are specifically configured to send fifth downlink data, the fifth downlink data includes the CBGs indicated by the P-bit feedback information as being needed to be retransmitted and/or the CBGs corresponding to bits where the third preset information is located in the N-bit feedback information.

The solutions of the embodiments of the disclosure are introduced mainly from the view of interaction between the network elements. It can be understood that, for implementing the functions, the terminal and the network-side device include corresponding hardware structures and/or software modules executing each function. Those skilled in the art may easily realize that the units and algorithm steps of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the terminal and the network-side device may be divided according to the abovementioned method examples. For example, each functional unit may be divided correspondingly to each function and two or more than two functions may also be integrated into a processing unit. The integrated unit may be implemented in a hardware form and may also be implemented in form of software program module. It is to be noted that division of the units in the embodiment of the disclosure is schematic and only logical function division and another division manner may be adopted during practical implementation.

Figure 6:
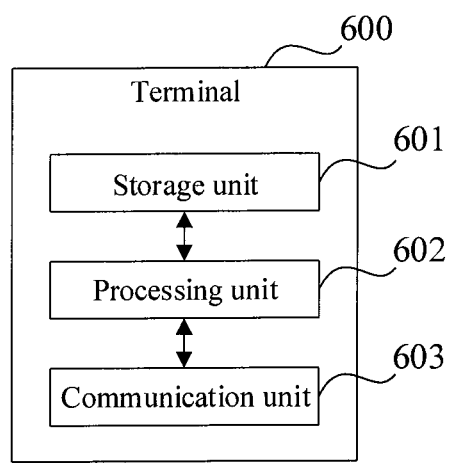
FIG. 6 illustrates a block diagram of functional units of a terminal according to an embodiment of the disclosure.

Under the condition that an integrated unit is adopted, FIG. 6 illustrates a possible block diagram of functional units of a terminal involved in the abovementioned embodiments. The terminal 600 includes a processing unit 602 and a communication unit 603. The processing unit 602 is configured to control and manage an operation of the terminal. For example, the processing unit 602 is configured to support the terminal to execute 2a02-2a04 in FIG. 2A, 2b02-2b04 and 2b07 in FIG. 2B, 2c02-2c04 and 2c07 in FIG. 2C, 2d02-2d04 and 2d06 in FIG. 2D and 2e02-2e04 and 2e06 in FIG. 2E, and/or is configured for another process of a technology described in the disclosure. The communication unit 603 is configured to support communication between the terminal and another device, for example, communication with the network-side device illustrated in FIG. 5. The terminal may further include a storage unit 601, configured to store a program code and data of the terminal.

The processing unit 602 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or another programmable logical device, transistor logical device, hardware component or any combination thereof. It may implement or execute various exemplary logical blocks, modules and circuits described in combination with the contents disclosed in the disclosure. The processor may also be a combination implementing a calculation function, for example, including a combination of one or more microprocessors and a combination of a DSP and a microprocessor. The communication unit 603 may be a transceiver, a transceiver circuit and the like. The storage unit 601 may be a memory.

When the processing unit 602 is a processor, the communication unit 603 is a communication interface and the storage unit 601 is a memory, the terminal involved in the embodiment of the disclosure may be the terminal illustrated in FIG. 4.

Figure 7:
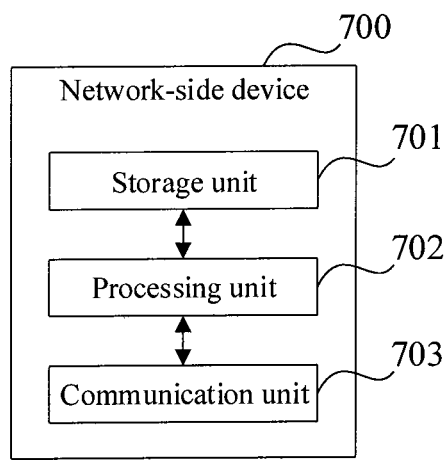
FIG. 7 illustrates a block diagram of functional units of a network-side device according to an embodiment of the disclosure.

Under the condition that an integrated unit is adopted, FIG. 7 is a possible block diagram of functional units of a network-side device involved in the abovementioned embodiments. The network-side device 700 includes a processing unit 702 and a communication unit 703. The processing unit 702 is configured to control and manage an operation of the network-side device. For example, the processing unit 702 is configured to support the network-side device to execute 2a01 and 2a05 in FIG. 2A, 2b01 and 2b05 in FIG. 2B, 2c01 and 2c05 in FIG. 2C, 2d01 and 2d05 in FIG. 2D and 2e01 and 2e05 in FIG. 2E, and/or is configured for another process of a technology described in the disclosure. The communication unit 703 is configured to support communication between the network-side device and another device, for example, communication with the terminal illustrated in FIG. 4. The network-side device may further include a storage unit 701, configured to store a program code and data of the network-side device.

The processing unit 702 may be a processor or a controller, which may be, for example, a CPU, a universal processor, a DSP, an ASIC, an FPGA or another programmable logical device, transistor logical device, hardware component or any combination thereof. It may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 703 may be a transceiver, a transceiver circuit, an RF chip and the like. The storage unit 701 may be a memory.

When the processing unit 702 is a processor, the communication unit 703 is a communication interface and the storage unit 701 is a memory, the network-side device involved in the embodiment of the disclosure may be the network-side device illustrated in FIG. 5.

Figure 8:
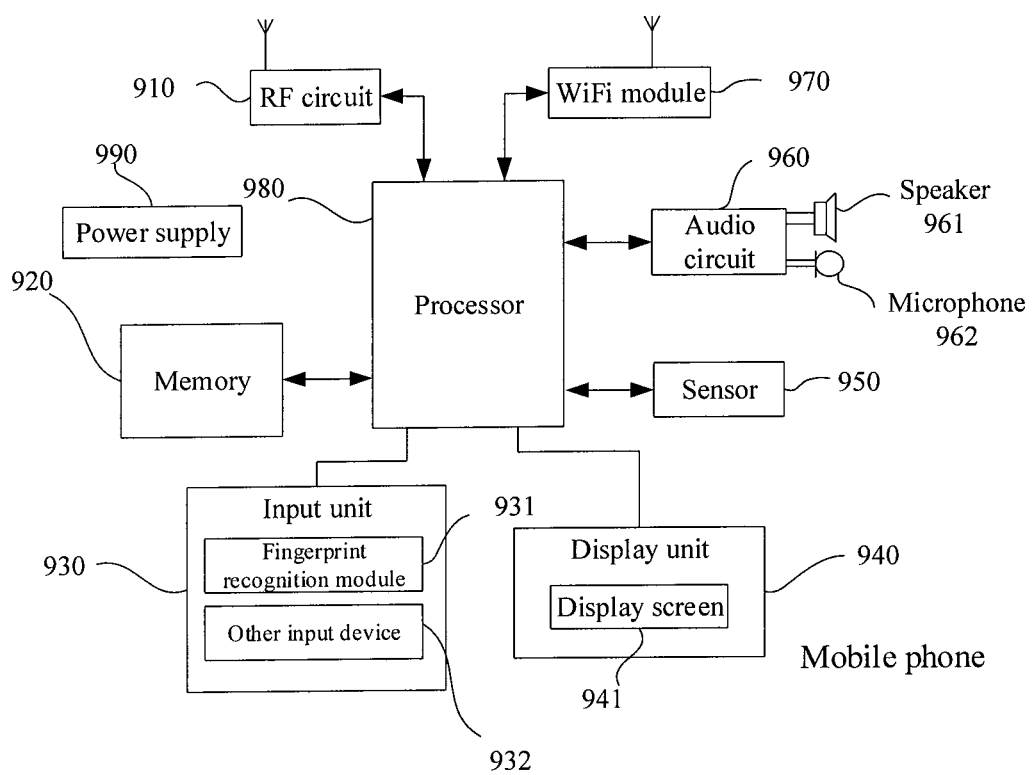
FIG. 8 illustrates a block diagram of another terminal according to an embodiment of the disclosure.

An embodiment of the disclosure also provides another terminal. As illustrated in FIG. 8, for convenience of description, only parts related to the embodiment of the application are illustrated, and specific technical details which are undisclosed refer to parts of the method of the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 8 illustrates a block diagram of part of a structure of a mobile phone related to a terminal according to an embodiment of the disclosure. Referring to FIG. 8, the mobile phone includes components such as a Radio Frequency (RF) circuit 910, a memory 920, an input unit 930, a display unit 940, a sensor 950, an audio circuit 960, a Wireless Fidelity (Wi-Fi) module 970, a processor 980 and a power supply 990. Those skilled in the art should know that the structure of the mobile phone illustrated in FIG. 8 is not intended to limit the mobile phone and may include components more or fewer than those illustrated in the figure or some components are combined or different component arrangements are adopted.

Each component of the mobile phone will be specifically introduced below in combination with FIG. 8.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may communicate with a network and another device through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), LTE, an electronic mail, Short Messaging Service (SMS) and the like.

The memory 920 may be configured to store software programs and modules. The processor 980 operates the software programs and modules stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information, and generate key signal input related to user setting and function control of the mobile phone. Specifically, the input unit 930 may include a fingerprint recognition module 931 and another input device 932. The fingerprint recognition module 931 may acquire fingerprint data of a user thereon. In addition to the fingerprint recognition module 931, the input unit 930 may further include another input device 932. Specifically, the another input device 932 may include, but not limited to, one or more of a touch screen, a physical keyboard, a function key (for example, a volume control button and a on/off button), a trackball, a mouse, a stick and the like.

The display unit 940 may be configured to display information input by the user or information provided for the user and various menus of the mobile phone. The display unit 940 may include a display screen 941. Alternatively, the display screen 941 may be in form of Liquid Crystal Display (LCD) and Organic Light-Emitting Diode (OLED). In FIG. 8, the fingerprint recognition module 931 and the display screen 941 implement input and output functions of the mobile phone as two independent components. However, in some embodiments, the fingerprint recognition module 931 and the display screen 941 may be integrated to implement the input and play functions of the mobile phone.

The mobile phone may further include at least one sensor 950, for example, a light sensor, a motion sensor and the like. Specifically, the light sensor may include an ambient light sensor and a proximity sensor. The ambient light sensor may regulate brightness of the display screen 941 according to brightness of ambient light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be provided in the mobile phone will not be elaborated herein.

An audio circuit 960, a speaker 961 and a microphone 962 provide audio interfaces between the user and the mobile phone. The audio circuit 960 may convert received audio data to electric signals, and transmit the electric signals to the speaker 961, and the speaker 961 converts the electric signals into sound signals for playing. On the other hand, the microphone 962 may collect sound signals and convert the collected sound signals into electric signals, the audio circuit 960 may receive and convert the electric signal into audio data, and the audio data is processed by the playing processor 980 and sent to, for example, another mobile phone through the RF circuit 910, or the audio data is stored into the memory 920 for further processing.

Wi-Fi is a short-distance wireless transmission technology. The mobile phone may help the user to receive and send an electronic mail, browse a webpage, access streaming media and the like through the Wi-Fi module 970, and wireless wideband Internet access is provided for the user. Although the Wi-Fi module 970 is illustrated in FIG. 8, it can be understood that it is not a necessary component of the mobile phone, and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and/or module stored in the memory 920 and calling data stored in the memory 920, thereby monitoring the whole mobile phone. Alternatively, the processor 980 may include one or more processing units.

Preferably, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 for supplying power to each part. Preferably, the power supply may be logically connected with the processor 980 through a power management system, thereby implementing functions of charging and discharging management, power consumption management and the like through the power management system.

Although not illustrated in the figure, the mobile phone may further include a camera, a Bluetooth module and the like, which will not be elaborated herein.

In the embodiments illustrated in FIG. 2A to 2E, the flow at a terminal side in each step of the method may be implemented based on the structure of the mobile phone.

In the embodiments illustrated in FIG. 4 and FIG. 5, each functional unit may be implemented based on the structure of the mobile phone.

An embodiment of the disclosure also provides a computer-readable storage medium, which stores a computer program configured for electronic data exchange, the computer program enabling a computer to execute part or all of the steps executed by the terminal in, for example, the abovementioned method embodiments.

An embodiment of the disclosure also provides a computer-readable storage medium, which stores a computer program configured for electronic data exchange, the computer program enabling a computer to execute part or all of the steps executed by the network-side device in, for example, the abovementioned method embodiments.

An embodiment of the disclosure also provides a computer program product. The computer program product includes a non-transitory computer-readable storage medium storing a computer program. The computer program may be operated to enable a computer to execute part or all of the steps executed by the terminal in, for example, the abovementioned method embodiments. The computer program product may be a software installation package.

An embodiment of the disclosure also provides a computer program product. The computer program product includes a non-transitory computer-readable storage medium storing a computer program. The computer program may be operated to enable a computer to execute part or all of the steps executed by the network-side device in, for example, the abovementioned methods. The computer program product may be a software installation package.

The steps of the method or algorithm described in the embodiments of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor.

The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made based on the technical solutions of the embodiments of the disclosure shall fall within the scope of protection of the embodiments of the disclosure.

The invention claimed is:

1. A method for data retransmission control, comprising:
   receiving, by a terminal, first downlink data, wherein the first downlink data is transmitted by a network-side device, wherein the first downlink data comprises P Code Block Groups (CBGs) in N CBGs of a preset transport block, and the first downlink data does not comprise N-P CBGs, which are CBGs in the N CBGs other than the P CBGs, P and N are positive integers, and P is less than N;
   acquiring, by the terminal, P-bit feedback information through decoding the P CBGs, wherein each bit of the feedback information indicates whether the respective CBG is needed to be retransmitted; and
   sending, by the terminal, information for notifying the network-side device to retransmit M CBGs, wherein the M CBGs comprise the CBGs needed to be retransmitted in the N CBGs, M is a positive integer, and M is less than N;
   wherein sending, by the terminal, the information comprises:
      sending, by the terminal, third information, in response to detecting that an available buffer space of a buffer of the terminal is more than or equal to a reference storage space, wherein the reference storage space is a buffer space for at least one CBG indicated by the P-bit feedback information as not being needed to be retransmitted, and wherein the third information comprises N-bit feedback information, wherein a bitmap correspondence relationship of the N-bit feedback information is the same as a sequence of the N CBGs of the preset transport block;
   wherein the N-bit feedback information comprises the feedback information at bit positions corresponding to the P CBGs in the N-bit feedback information and the feedback information at bit positions corresponding to the N-P CBGs in the N-bit feedback information, wherein the feedback information at bit positions corresponding to the P CBGs in the N-bit feedback information is the acquired P-bit feedback information, and the feedback information at bit positions corresponding to the N-P CBGs in the N-bit feedback information is second preset information;
   wherein the third information is used for notifying the network-side device to retransmit the CBGs indicated by the acquired P-bit feedback information as being needed to be retransmitted; and
   wherein the second preset information for the remaining N-P feedback information bits is set to positive acknowledgment (ACK).

2. The method of claim 1, after sending, by the terminal, the information, further comprising:
   receiving, by the terminal, the M CBGs.

3. The method of claim 1, wherein the CBGs needed to be retransmitted in the N CBGs comprise at least one of the following:
   the CBGs indicated by the P-bit feedback information as being needed to be retransmitted; or
   the CBGs in the N CBGs other than the P CBGs.

4. The method of claim 1, wherein receiving, by the terminal, the M CBGs comprises:
   receiving, by the terminal, fourth downlink data, wherein the fourth downlink data comprises the CBGs indicated by the P-bit feedback information as being needed to be retransmitted.

5. The method of claim 1, wherein receiving, by the terminal, the M CBGs comprises:
   receiving, by the terminal, fourth downlink data, wherein the fourth downlink data comprises the CBGs indicated by the P-bit feedback information as being needed to be retransmitted.

6. A terminal, comprising a processor and a transceiver, wherein
   the processor is configured to receive, through the transceiver, first downlink data, wherein the first downlink data is transmitted by a network-side device, wherein the first downlink data comprises P Code Block Groups (CBGs) in N CBGs of a preset transport block, and the first downlink data does not comprise N-P CBGs, which are CBGs in the N CBGs other than the P CBGs, P and N are positive integers, and P is less than N;
   the processor is further configured to acquire P-bit feedback information through decoding the P CBGs, wherein each bit of the feedback information indicates whether the corresponding CBG is needed to be retransmitted; and the processor is further configured to send, through the transceiver, information for notifying the network-side device to retransmit M CBGs, wherein the M CBGs comprise the CBGs needed to be retransmitted in the N CBGs, M is a positive integer and M is less than N;

wherein the processor is configured to send, through the transceiver, third information, in response to detecting that an available buffer space of a buffer of the terminal is more than or equal to a reference storage space, wherein the reference storage space is a buffer space for at least one CBG indicated by the P-bit feedback information as not being needed to be retransmitted, and wherein the third information comprises N-bit feedback information, wherein a bitmap correspondence relationship of the N-bit feedback information is the same as a sequence of the N CBGs of the preset transport block;

wherein the N-bit feedback information comprises the feedback information at bit positions corresponding to the P CBGs in the N-bit feedback information and the feedback information at bit positions corresponding to the N-P CBGs in the N-bit feedback information, wherein the feedback information at bit positions corresponding to the P CBGs in the N-bit feedback information is the acquired P-bit feedback information, and the feedback information at bit positions corresponding to the N-P CBGs in the N-bit feedback information is second preset information;

wherein the third information is used for notifying the network-side device to retransmit the CBGs indicated by the acquired P-bit feedback information as being needed to be retransmitted; and wherein the second preset information for the remaining N-P feedback information bits is set to positive acknowledgment (ACK).

7. The terminal of claim 6, after sending the information, the processor is further configured to receive, through the transceiver, the M CBGs.

8. The terminal of claim 6, wherein the CBGs needed to be retransmitted in the N CBGs comprise at least one of the following:

the CBGs indicated by the P-bit feedback information as being needed to be retransmitted; or the CBGs in the N CBGs other than the P CBGs.

9. The terminal of claim 6, wherein the processor is configured to send, through the transceiver, first information, wherein the first information comprises (P+1)-bits feedback information, wherein a first preset bit of the feedback information in the (P+1)-bits feedback information is a first preset numerical value, the feedback information in the (P+1)-bits feedback information other than the first preset numerical value is first preset information, and the first information is used for notifying the network-side device to retransmit the N CBGs; and wherein the processor is configured to receive, through the transceiver, second downlink data, wherein the second downlink data comprises the N CBGs.

10. The terminal of claim 6, wherein the processor is configured to send, through the transceiver, second information, wherein the second information comprises (P+1)-bits feedback information, wherein a second preset bit of the feedback information in the (P+1)-bits feedback information is a second preset numerical value, the P-bit feedback information in the (P+1)-bits feedback information other than the second preset bit is the acquired P-bit feedback information, and the second information is used for notifying the network-side device to retransmit the CBGs indicated by the P-bit feedback information as being needed to be retransmitted; and wherein the processor is configured to receive, through the transceiver, third downlink data, wherein the third downlink data comprises the CBGs indicated by the P-bit feedback information as being needed to be retransmitted.

11. The terminal of claim 6, wherein the processor is configured to receive, through the transceiver, fourth downlink data, wherein the fourth downlink data comprises the CBGs indicated by the P-bit feedback information as being needed to be retransmitted.

12. A network-side device, comprising a processor and a transceiver, wherein the processor is configured to send, through the transceiver, first downlink data, wherein the first downlink data is transmitted by the network-side device to a terminal, wherein the first downlink data comprises P Code Block Groups (CBGs) in N CBGs of a preset transport block, and the first downlink data does not comprise N-P CBGs, which are CBGs in the N CBGs other than the P CBGs, P and N are positive integers and P is less than N; and the processor is further configured to receive, through the transceiver, information for notifying the network-side device to retransmit M CBGs, wherein the M CBGs comprise the CBGs needed to be retransmitted in the N CBGs, M is a positive integer and M is less than N;

wherein the processor is further configured to receive, through the transceiver, third information, in response to detecting that an available buffer space of a buffer of the terminal is more than or equal to a reference storage space, wherein the reference storage space is a buffer space for at least one CBG indicated by the P-bit feedback information as not being needed to be retransmitted, and wherein the third information comprises N-bit feedback information, wherein a bitmap correspondence relationship of the N-bit feedback information is the same as a sequence of the N CBGs in the preset transport block;

wherein the N-bit feedback information comprises the feedback information at bit positions corresponding to the P CBGs in the N-bit feedback information and the feedback information at bit positions corresponding to the N-P CBGs in the N-bit feedback information, wherein the feedback information at bit positions corresponding to the P CBGs in the N-bit feedback information is the acquired P-bit feedback information, the feedback information at bit positions corresponding to the N-P CBGs in the N-bit feedback information is second preset information;

wherein the third information is used for retransmitting the CBGs indicated by the acquired P-bit feedback information as being needed to be retransmitted; and wherein the second preset information for the remaining N-P feedback information bits is set to positive acknowledgment (ACK).

13. The network-side device of claim 12, wherein the CBGs needed to be retransmitted in the N CBGs comprise at least one of the following:

the CBGs indicated by the P-bit feedback information as being needed to be retransmitted; or the CBGs in the N CBGs other than the P CBGs.

14. The network-side device of claim 12, wherein the processor is further configured to send, through the transceiver, fourth downlink data, wherein the fourth downlink data comprises the CBGs indicated by the acquired P-bit feedback information as being needed to be retransmitted.

* * * * *